3,290,338
16-ALKYLPROGESTERONES AND THEIR
9α,11β-DIHALOGENO ANALOGS
Elliot L. Shapiro, Irvington, and Eugene P. Oliveto, Glen Ridge, N.J., assignors to Schering Corporation, Bloomfield, N.J., a corporation of New Jersey
No Drawing. Filed June 1, 1959, Ser. No. 817,065
The portion of the term of the patent subsequent to Nov. 21, 1978, has been disclaimed
18 Claims. (Cl. 260—397.4)

This invention relates to novel and therapeutically useful 16-alkylated steroids of the pregnane series. In particular, this invention relates to 16-alkylprogesterones and their 9α,11β-dihalogeno analogs which may be further substituted at the 6, 17, and 21 carbon atoms. Also envisioned as falling within our invention are the 1,2-dehydro analogs, 19-nor analogs and the 1-dehydro-4,5-dihydro-allopregnene isomers of the aforementioned progesterones. These compounds are valuable progestational agents, or intermediates thereto.

The novel compounds of our invention are compounds of the group represented by the following formulae, the 19-nor, 1-dehydro, and the 1-dehydro-4,5-dihydro-allo analogs thereof:

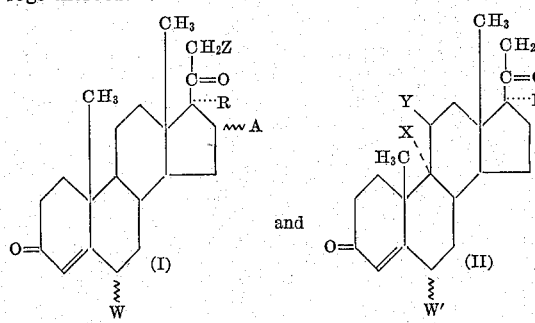

wherein A is a lower alkyl group such as, for example, α-methyl, β-methyl, α-ethyl, β-ethyl, α-propyl, β-propyl, α-isopropyl, β-isopropyl, α-butyl, β-butyl, α-(tert.)-butyl, and β-(tert.)-butyl; R and R' are members of the group consisting of hydrogen, methyl, halogen of atomic weight greater than 19 and less than 126 (i.e. chlorine and bromine), hydroxy, and acyloxy groups of carboxylic acids; W and W' are members of the group consisting of hydrogen, methyl, chlorine and fluorine; X is a halogen having an atomic weight greater than 19; Y is a halogen having an atomic weight less than 126 and being at least as electronegative as X; and Z and Z' are members of the group consisting of hydrogen and halogen, with at least one of the substituents W, R and Z being other than hydrogen. The bonds designated by a wavy line (∿) in the above formulae indicated that the substituents at the 6 and 16 carbons may be in an α or β-position. In this application, whenever the configuration at 6 and 16 is not specifically designated as α or β, both configurations are included. Thus, the compound name 6,16-dimethylprogesterone encompasses the four isomeric configurations, namely 6α,16α-dimethylprogesterone, 6α,16β-dimethylprogesterone, 6β,16α-dimethylprogesterone and 6β,16β-dimethylprogesterone.

Illustrative of the 17α-acyl group which may be present are lower alkanoates such as formate, acetate, propionate, butyrate, isobutyrate, valerate, isovalerate, pivalate, caproate (n-hexanoate), enanthate; substituted alkanoates such as β-cyclopentylpropionate, cyclohexylacetate, ethoxyacetate, phenylacetate, phenoxyacetate; unsaturated acyl radicals such as acrylate and crotonate, aromatic acyl radicals such as benzoate and toluate, as well as the acyl portions of dibasic acids such as succinate and phthalate and of fatty acids such as undecanoate and laurate. The term "acyloxy" thus includes acyl radicals of monocarboxylic and docarboxylic acids containing up to 12 carbon atoms.

Novel progestins of our invention are typified by 16-alklprogesterones and by 9α,11β-dihalogeno-16-alkylprogesterones such as 9α,11β-dichloro-16α-methylprogesterone,
9α,11β-dichloro-16β-methylprogesterone,
9α-bromo-11β-chloro-16α-methylprogesterone,
9α-chloro-11β-fluoro-16β-ethylprogesterone,
6α,16α-dimethylprogesterone,
6β,16β-dimethylprogesterone,
6α,16β-dimethylprogesterone,
6β,16α-dimethylprogesterone,
6α-fluoro-16β-methylprogesterone,
6α-fluoro-16α-methylprogesterone,
6β-fluoro-16α-methylprogesterone and 6β-fluoro-16β-methylprogesterone,
6α-fluoro-9α,11β-dichloro-16α-methylprogesterone,
6α,16α-dimethyl-9α,11β-dichloroprogesterone,
16α-methyl-17α-acetoxyprogesterone,
16β-methyl-17α-acetoxyprogesterone,
16α-methyl-17α-hydroxyprogesterone 17-caproate
 (16α-methyl-17α-caproxyprogesterone),
9α,11β-dichloro-16α-methyl-17α-acetoxyprogesterone,
9α-bromo-11β-chloro-16α-methyl-17α-
 acetoxyprogesterone,
9α-bromo-11β-fluoro-16α-methyl-17α-
 hydrozyprogesterone 17-caproate,
9α-chloro-11β-fluoro-16α-methyl-17α-acetoxyprogesterone
16α-methyl-21-iodoprogesterone,
16α-methyl-21-fluoroprogesterone,
16β-methyl-21-fluoroprogesterone,
9α,11β-dichloro-21-iodo-16α-methylprogesterone and
9α,11β-dichloro-21-fluoro-16α-methylprogesterone and the like.

Typical polysubstituted-16-alkyl-progesterones of our invention are

6α,16α-dimethyl-17α-acetoxyprogesterone,
6α,16α-dimethyl-17α-hydroxyprogesterone 17-caproate,
6β,16β-dimethyl-17α-acetoxyprogesterone,
6α,16α-dimethyl-17α-acetoxy-21-iodoprogesterone,
6α-fluoro-16α-methylprogesterone,
6β-fluoro-16α-methylprogesterone,
6β-fluoro-16β-methylprogesterone,
6α,16α-dimethyl-21-fluoroprogesterone,
6β,16β-dimethyl-17α-acetoxy-21-iodoprogesterone, the 9α,11β-dichloro derivatives of the aformentioned polysubstituted-16-alkylprogesterones, as well as the 9α,11β-dihalogeno compounds such as 6α,16α-dimethyl-9α-chloro-11β-fluoroprogesterone,
6α-fluoro-9α-bromo-11β-chloro-16α-methylprogesterone,
9α-chloro-11β,21-difluoro-16α-methylprogesterone, and
6α-16α-dimethyl-9α-bromo-11β-fluoro-17α-
 hydroxyprogesterone 17-caproate.

As indicated heretofore, our compounds are valuable progestins or, as in the case of the 17α-hydroxy compounds, valuable intermediates. Our preferred species are the 17-acyloxy-16-alkylprogesterones and in particular, 16α - methyl - 17α - acetoxyprogesterone, 16β-methyl-17α - acetoxy progesterone, 9α,11β - dichloro - 16α-methyl - 17α - acetoxyprogesterone, 9α,11β - dichloro-16β - methyl - 17α - acetoxyprogesterone, 9α - chloro-11β - fluoro - 16α - methyl - 17α - acetoxyprogesterone and 9α - chloro - 11β-fluoro-16β-methyl-17α-acetoxyprogesterone, and the corresponding 17-caproate esters thereof.

Our 9,11-dihalogeno compounds may contain chlorine, bromine or iodine at C–9 and fluorine, chlorine and bromine at C-11. This artificial limitation is necessitated by limitations of the manufacturing process.

The novel 6-substituted, 6,17-disubstituted, and 6,17,21-trisubstituted -16-alkylprogesterones of Formulae I and II are prepared from the corresponding 16-alkylprogesterones by a combination of methods analogous to known procedures. Some starting compounds, such as 16α-methylprogesterone and 16β-methylprogesterone, are known while others, e.g. 16α-ethylprogesterone and 16α-n-butylprogesterone, are prepared from 16-dehydropregnenolone (3β-hydroxy - 5,16 - pregnadiene-20-one) by known techniques using the Grignard reagents ethyl magnesium iodide and n-butylmagnesium iodide to form 16α-ethylpregnenolone and 16α-n-butylpregnenolone respectively, which, upon reaction with aluminum isopropylate, are transformed respectively to 16α-ethylprogesterone and 16α-n-butylprogesterone. The 16β-alkylprogesterones are conveniently obtained from the corresponding 16α-alkyl-pregnenolones, such as the aforementioned 16α-ethylpregnenolone, by bromination in conventional manner with bromine in acetic acid to form a 5,6,17-tribromo intermediate, exemplified by 5,6,17-tribromo-16α-ethylpregnane-3β-ol-20-one, which, upon reaction with a debrominating reagent such as sodium iodide in methanol yields a 17-bromo-intermediate, 16α-ethyl-17α-bromopregnenolone. Dehydrobromination with dimethylformamide to the 16-dehydro intermediate, 16-ethyl-16-dehydropregnenolone, followed by reduction with hydrogen in the presence of Raney nickel or palladium catalyst yields 16β-ethyl-$\Delta^5$-pregnenolone which is oxidized, e.g. with aluminum isopropoxide, to 16β-ethylprogesterone.

The introduction of a 17α-hydroxy group into a 16-alkylprogesterone such as, for example, 16α-methylprogesterone is also effected by a combination of conventional procedures. Typically, a 16-alkylpregnane such as 16α-methylpregnenolone acetate (3β-hydroxy-16α-methyl-5-pregnene-20-one 3-acetate) is reacted with chlorine in chloroform or carbon tetrachloride with or without the presence of pyridine to give the corresponding 5,6-dichloropregnane, which, upon treatment with acetic anhydride and a catalyst such as p-toluenesulfonic acid or perchloric acid results in the transformation of the 20-ketopregnane to the 20-enolacetate form, i.e. 3β,20-dihydroxy-5,6-dichloro-16α-methyl-17(20)-pregnene-3,20-diacetate. Epoxidation of the enolacetate with a peracid such as perbenzoic or peracetic followed by alkaline treatment yields the 17α-hydroxy intermediate, 16α-methyl-5,6-dichloropregnane-3β,17α-diol-20-one. The 3β-hydroxypregnane is oxidized to the 3-keto analog by means of chromic acid which, when reacted with zinc in ethanol or acetic acid or with chromous chloride followed by acid or base equilibration, yields a 17α-hydroxy substituted compound of our invention, 16α-methyl-17α-hydroxyprogesterone.

Esterification of the hydroxyl function at the 17-carbon in a compound such as 16α-methyl-17α-hydroxyprogesterone is conveniently effected with a lower fatty acid anhydride such as acetic anhydride in the presence of p-toluenesulfonic acid or preferably with a lower aliphatic acid such as acetic acid in the presence of trifluoroacetic anhydride to give the corresponding 17-ester, for example, 16α-methyl-17α-acetoxyprogesterone. By substituting other lower alkanoic acids such as β-cyclopentylpropionic and caproic for acetic in the aforementioned esterification procedures, other 17α-lower alkanoate 16-alkyl compounds are obtained such as the 17α-(β-cyclopenylpropionate) and 17-caproate respectively of 16α-methyl-17α-hydroxyprogesterone.

A 6-substituent is introduced into a 16-alkylprogesterone to form a novel 6-substituted-16-alkylprogesterone of our invention by employing known chemical techniques. A 16-alkylprogesterone such as 16α-methylprogesterone or 16α-methyl-17α-hydroxyprogesterone is treated with ethylene glycol by known procedures to form the 3,20-bis-ethylene ketal derivative which, in turn, is expoxidized on treatment with a peracid such as peracetic or preferably monoperphthalic acid to give the epoxy derivatives, 5α,6α-epoxy-16α-methylpregnane-3,20-dione-3,20 - bis - ethylene ketal and 5α,6α-epoxy-16α-methyl-17α-hydroxypregnane-3,20-dione 3,20-bis-ethylene ketal respectively. From this epoxy intermediate both the 6-methyl and 6-fluoro substituents may be introduced into the pregnane nucleus. Thus, the action of hydrofluoric acid on the epoxy bis-ethylene ketal intermediate simultaneously hydrolyzes the bis-ethylene ketal groups and opens the epoxy ring yielding the 5α-hydroxy-6β-fluoro intermediate, e.g. 5α-hydroxy-6β-fluoro-16α-methylpregnane-3,20-dione or 5α-hydroxy-6β-fluoro-16α-methyl - 17α - hydroxypregnane - 3,20-dione; whereas addition of a Grignard reagent such as methyl magnesium iodide with subsequent hydrolysis yields the 5α-hydroxy-6β-methyl compound, e.g. 5α-hydroxy-6β,16α-dimethylpregnane-3,20-dione or 5α,17α-dihydroxy-6β,16α-dimethylpregnane-3,20-dione. A reagent such as ethanolic hydrochloric acid on these 5α-hydroxy-6β-substituted-16α-methylpregnanes simultaneously dehydrates the 5α-hydroxy group and epimerizes the 6β-substituent to yield respectively, 6α-fluoro-16α-methyl-17α-hydroxyprogesterone and 6α,16α-dimethyl-17α-hydroxyprogesterone. In order to obtain a 6β-configuration, the 5α-hydroxy-6β-substituted pregnane intermediates are treated with, for example, thionyl chloride in a cold basic medium such as pyridine or in approximately 90% acetic acid to give 16-alkylprogesterones such as 6β-fluoro-16α-methyl-17α-hydroxyprogesterone and 6β,16α-dimethyl-17α-hydroxyprogesterone. The 6α-substituted-16-alkylprogesterones may also be prepared from the corresponding 6β-substituted isomers by means of alcoholic solutions of acids or bases such as ethanolic hydrogen chloride and ethanolic potassium hydroxide.

When preparing a 6-substituted-16-alkyl-17α-acyloxyprogesterone of our invention, it is preferable to first introduce the 6-substituent into a 17α-hydroxy starting compound followed by esterification of the 6-substituted-17α-hydroxy-16-alkylprogesterone thereby formed. Thus, a 17α-hydroxy compound such as 6α,16α-dimethyl-17α-hydroxyprogesterone, when esterified by procedures heretofore described, such as with caproic acid in the presence of trifluoroacetic anhydride yields the corresponding 17α-acyloxyprogesterone, e.g. 6α,16α-dimethyl-17α-hydroxyprogesterone 17-caproate.

Iodine may be introduced into the 21-position of 16-alkylprogesterones such as 16α-methylprogesterone and 6α,16α-dimethyl-17α-hydroxyprogesterone, by procedures which utilizes iodine in the presence of an alkaline substance such as sodium hydroxide or calcium oxide, thus producing 21-iodo-16-alkylprogesterones of the general Formula I. The 17-hydroxy-21-iodo substituted compound thus produced (e.g. 6α,16α-dimethyl-17α-hydroxy-21-iodoprogesterone) is conveniently converted to a 17α-acyloxy progesterone by usual esterification techniques.

The 21-fluoro-16α-alkylprogesterones of Formula I are obtained from their corresponding 21-iodo analogs by the action of silver fluoride in moist acetonitrile to give compounds such as 21-fluoro-16α-methylprogesterone and 6α,16α-dimethyl-21-fluoroprogesterone.

The novel 9α,11β-dihalogeno-16-alkylprogesterones depicted by Formula II are prepared by reacting a suitable halogenating agent with a 16-alkyl-4,9(11)pregnadiene-3,20-dione or with a 6-, 17- or 21-monosubstituted or a 6,17-, 6,21-, or 17,21-disubstituted, or a 6,17,21-trisubstituted-6-alkyl-4,9(11)-pregnadiene-3,20-dione, the preferred substituents at the 6-carbon being fluorine or methyl, at the 17-carbon being hydroxy, acyloxy, halogen or methyl; and at the 21-carbon being fluorine or iodine. Our starting compounds are represented by $\Delta^{9(11)}$-unsaturated progesterones such as 16α-methyl-9(11)-dehydroprogesterone,
6α,16α-dimethyl-9(11)-dehydropogesterone,
6α-fluoro-16α-methyl-9(11)-dehydroprogesterone, 16α-methyl-21-iodo-9(11)-dehydroprogesterone,
16α-methyl-21-fluoro-9(11)-dehydroprogesterone,
6α,16α-dimethyl-17α-hydroxy-9(11)-dehydroprogesterone,
6α,16α-dimethyl-17α-acetoxy-9(11)-dehydroprogesterone,
6α-fluoro-16α-methyl-9(11)-dehydroprogesterone,
6β-fluoro-16α-methyl-17α-hydroxy-9(11)-dehydroprogesterone,
6α-fluoro-16α-methyl-17α-caprooxy-9(11)-dehydroprogesterone,
6α,21-difluoro-16α-methyl-17α-acetoxy-9(11)-dehydroprogesterone,
16β-ethyl-9(11)-dehydroprogesterone,
16β-methyl-21-iodo-9(11)-dehydroprogesterone and the like.

The starting materials necessarily possessing a $\Delta^{9(11)}$-bond are prepared from the 16-alkylprogesterones of Formula I by hydroxylating microbiologically at C–11 with the aid of a microorganism such as *Curvularia lunata* (N.R.L. 2380) or *Rhizopus nigricans* (A.T.C.C. 6227b) using procedures analogous to those described in U.S. Patent No. 2,658,023 and U.S. Patent No. 2,602,769, respectively. When *Curvularia lunata* is employed, the 11β-hydroxy-16-alkylprogesterone produced is dehydrated by a reagent such as methanesulfonyl chloride in the presence of pyridine or phosphorus oxychloride in pyridine to give the necessary intermediates. On the other hand, the action of *Rhizopus nigricans* on a 16-alkylprogesterone such as 6α-fluoro-16α-methyl-17α-hydroxyprogesterone yields the corresponding 11α-hydroxy derivative, 6α-fluoro-16α-methyl - 11α,17α - dihydroxyprogesterone, which upon subsequent treatment with a sulfonyl chloride such as methanesulfonyl chloride or toluenesulfonyl chloride yields the corresponding 11α-sulfonate which, when treated with a base such as pyridine or sodium acetate give the 9(11)-dehydro intermediate, exemplified by 6α-fluoro-16α-methyl - 17α - hydroxy-9(11)-dehydroprogesterone.

It is sometimes advantageous to 11-hydroxylate a 16-alkylprogesterone before adding substituents at other positions in the molecule such as at the 6, 17, or 21-carbon. Typically, a progesterone such as 16α-methylprogesterone may be fermented with *Rhizopus nigricans* to yield 11α-hydroxy-16α-methylprogesterone. The 6α-methyl group is then introduced as described above yielding 6α,16α-dimethyl-11α-hydroxy-16α-progresterone, which is converted to 6α,16α-dimethyl-9(11)-dehydroprogesterone.

In preparing 9,11-dihalogeno compounds which contain 17α-acyloxy group, it is possible to introduce the $\Delta^{9(11)}$-bond into a 17α-hydroxyprogesterone and then esterify before or after introducing halogen at the 9 and 11-positions. For example, to prepare a 17α-acyloxy intermediate such as 16α-methyl-17α-acetoxy-9(11)-dehydroprogesterone, the corresponding 17α-hydroxy compound, 16α-methyl-17α-hydroxyprogesterone is first 11α-hydroxylated by means of *Rhizopus nigricans* followed by esterification and dehydration according to previously described procedures to give 16α-methyl-17α-hydroxy-9(11)-dehydroprogesterone which, upon esterification with acetic acid and trifluoroacetic anhydride, yields 16α-methyl-17α-acetoxy-9(11)-dehydroprogesterone. By halogenating the 17α-acyloxy - 9(11) - dehydroprogesterone intermediate thus produced, there is obtained directly a 9α-11β-dihalogeno-17α-acyloxy compound of Formula II. The same compound may be obtained by halogenating a 17α-hydroxy-$\Delta^{9(11)}$-intermediate, e.g. 16α - methyl-17α-hydroxy-9(11)-dehydroprogesterone to the corresponding 9α,11β-dihalogeno-16α-methyl - 17α - hydroxyprogesterone, followed by esterification of the 17-hydroxy group in the usual manner.

In general, the 9α,11β-dihalogeno compounds of Formula II are prepared from the above-mentioned 9(11)-dehydroprogesterone intermediates by utilizing halogenating agents under reaction conditions described in the copending applications, Serial No. 743,492 of Gould et al., filed on June 20, 1958, and Serial No. 817,079 of Robinson filed June 1, 1959, now U.S. 3,009,933.

In preparing the 1-dehydro analogs of the previously described 16-alkylprogesterones and the 9α,11β-dihalogeno-16-alkylprogesterones of our invention, the $\Delta^1$-bond may be introduced at various stages during the synthesis of the compound and preferably at the later stages. Thus, a 9α,11β-dihalogeno-16-alkyl-1-dehydroprogesterone such as 6α,16α-dimethyl-9α,11β-dichloro-17α-acetoxy-1-dehydroprogesterone (6α,16α-dimethyl-9α,11β-dichloro-17α-hydroxy-1,4-pregnadiene - 3,20 - dione 17-acetate) is prepared from the corresponding 9α,11β-dihalogeno-16-alkylprogesterone, i.e. 6α,16α-dimethyl-9α,11β-dichloroprogesterone, by microbiological dehydrogenation with an organism such as *Corynebacterium simplex* (A.T.C.C. 6946) in a manner similar to that described in U.S. Patent No. 2,837,464, or by chemical dehydrogenation through the use of such reagents as chloranil or selenium dioxide. Alternatively, the 9α,11β-dihalogeno-1-dehydroprogesterone is obtained by dehydrogenating a 9(11)-dehydroprogesterone such as 6α,16α-dimethyl-17α-hydroxy-9(11)-dehydroprogesterone with *Corynebacterium simplex* to give 6α,16α-dimethyl - 17α - hydroxy-1,4,9(11)-pregnatriene-3,20-dione, which upon chlorination yields 6α,16α-dimethyl - 9α,11β - dichloro - 17α - hydroxy-1-dehydroprogesterone. The 17α-hydroxypregnadiene thus produced may be converted to the 17-acyloxy compound, 6α,16α-dimethyl-9α,11β-dichloro - 17α - acetoxy-1-dehydroprogesterone.

The $\Delta^1$-5α-allopregnene analogs of the compounds of Formulae I and II are obtained from the intermediates described above. For example, 16α-methyl-17α-hydroxyprogesterone when subjected to the action of a catalyst such as palladium in a solvent such as ethanol, ethyl acetate or tetrahydrofuran, or to the action of lithium in liquid ammonia, followed by oxidation with chromic acid of the 20-alcohol thereby formed, yields 16α-methyl-17α-hydroxyallopregnane-3,20-dione. Reaction of the aforementioned allopregnane with one equivalent of a halogen such as bromine yields the 2-bromo-analog which is dehydrohalogenated with a reagent such as collidine or dimethylformamide in the presence of calcium carbonate yielding 16α-methyl-17α-hydroxy-1-allopregnene-3,20-dione. The 17α - hydroxy-1-allopregnene thus obtained upon esterification with trifluoroacetic anhydride and a suitable acid such as caproic acid yields 16α-methyl-17α-hydroxy-1-allopregnene-3,20 - dione 17-caproate.

Using similar techniques, 6-substituted analogs of the foregoing allopregnenes are obtained. Bromination of 6α,16α - dimethyl-11α,17α-dihydroxyallopregnane - 3,20-dione to the 2-bromo analog with subsequent dehydrohalogenation at $C_1$ and $C_2$ followed by dehydration of the 11α-hydroxy moiety yields the 9(11)-dehydro intermediate, 6α,16α - dimethyl-17α-hydroxy-1,9(11)-allopregnadiene-3,20-dione. Halogenation of the $\Delta^{9(11)}$-bond with chlorine in carbon tetrachloride in the presence of pyridine, for example, yields 9α,11β-dihalogeno-17α-hydroxyallopregnenes such as 9α,11β-dichloro-6α,16α-dimethyl-17α-hydroxy-1-allopregnene-3,20 - dione. Similiary, 6α-fluoro-16α-methyl-17α-hydroxy-$\Delta^{9(11)}$-allopregnene-3,20-dione upon bromination to the 2-bromo analog followed by dehydrobromination as described above yields the $\Delta^{1,9(11)}$-diene, 6α-fluoro-16α-methyl-17α-hydroxy-1,9(11)-allopregnadiene-3,20-dione. Addition of a halogen such as chlorine yields the corresponding 9α,11β-dichloro-17α-hydroxy compound which may be esterified to give 6α - fluoro - 9α,11β-dichloro-16α-methyl-17α-hydroxy-$\Delta^1$-allopregnene-3,20-dione 17-acetate.

The 19-nor analogs of our invention are obtained by pyrolysis of the aforementioned 1,4-dieneones. For example, 16α - methyl-17α-hydroxy-1-dehydro-progesterone is pyrolyzed either in the solid state or in an inert solvent to effect elimination of the 19-methyl and concomitant aromatization of ring A. The 3,17α-dihydroxy-17β-acetyl-16α-methyl-1,3,5-estratriene thus obtained is converted to its 3-methyl ether with dimethylsulfate in alkaline methanol. The 3-methoxy-16-methyl-17α-hydroxy-17β-acetyl-1,3,5-estratriene is converted to the corresponding 20-ethylene ketal which is reacted with liquid ammonia and lithium in the presence of a proton donor such as ethanol, and subsequently treated with a reagent such as methanolic hydrochloric acid to give 16α-methyl-17α-hydroxy-19-norprogesterone. If in the last step of the aforementioned procedure, one employs oxalic acid instead of hydrochloric acid one may obtain an intermediary compound 16α - methyl - 17α - hydroxy-19-nor-Δ$^{5(10)}$-pregnene-3,20-dione which, upon stronger acid treatment, then converts to the above 19-norprogesterone. The following compounds may be obtained from 16α-methyl - 17α - hydroxy - 19 - norprogesterone prepared as above by utilizing a series of reactions similar to those outlined heretofore for the corresponding 19-methyl analogs: 6α,16α - dimethyl-17α-hydroxy-19-norprogesterone, 6α - fluoro-16α-methyl-17α-hydroxy-19-norprogesterone, 6α,21 - difluoro-16α-methyl-17α-hydroxy-19-norprogesterone, 6α,16α-dimethyl-17α-hydroxy-21-fluoro-19-norprogesterone; the 21-iodo analogs of the latter two compounds as well as the 9,11-dihalogeno (i.e. 9α,11β-dichloro-, 9α-chloro-11β-fluoro, and the like) derivatives of above-mentioned 19-nor compounds. The 17-hydroxy compounds mentioned are esterified as described for the 19-methyl compounds to give the lower fatty acid esters such as acetate or caproate.

Other 19-norprogesterones which may be obtained by employing techniques similar to those described above are compounds such as 16α-methyl-21-iodo-19-norprogesterone, 16α-methyl-21-fluoro-19-norprogesterone, 6α,16α-dimethyl-19-norprogesterone, 6α - fluoro-16α-methyl-19-norprogesterone, 6α,16α - dimethyl-21-iodo-19-norprogesterone, 6α,16α-dimethyl-21-fluoro-19-norprogesterone, 6α-fluoro-16α - methyl-21-iodo-19-norprogesterone, 6α,21-difluoro-16α-methyl-19-norprogesterone and the 9α,11β-dihalogeno analogs thereof, for example, 6α,16α-dimethyl-9α,11β-dichloro-19-norprogesterone and 6α,16α-dimethyl-9α-chloro-11β-fluoro-19-norprogesterone as well as 11α - hydroxy - 16α - methyl-19-norprogesterone and 11α,17α - dihydroxy - 16α - methyl-19-norprogesterone. The synthesis of the 19-nor compounds as described for the 16α-alkylprogesterones pertains equally well for 16β-alkylprogesterones such as 16β-methylprogesterone.

Progesterones having a methyl substituent at C–17 are prepared according to sequences of reactions similar to the following. 3β-hydroxy-5,6-dichloro-16α-methylpregnane-20-one 3-acetate is brominated to the corresponding 17-bromo analog which, after reaction with potassium bicarbonate in aqueous methanol yields the 17-carboxylate, i.e. 5,6-dichloro-16α,17α-dimethyl-17β-carbomethoxyandrostane-3β-ol. Reaction of the 5,6-dichloro compound with zinc in acetic acid yields the Δ$^{5,6}$-analog which upon saponification with an alkali followed by reaction of the free acid with oxalyl chloride in benzene gives the corresponding 17-acyl chloride which, by means of dimethyl cadmium, is transformed into 3β-hydroxy-16α,17α-dimethyl-5-pregnene-20-one. Oxidation of the 3β-hydroxy group with chromic acid followed by treatment with alkali or acid gives 16α,17α-dimethylprogesterone. By reactions similar to those described above, the 16α,17α-dimethylprogesterone thus prepared may be transformed into the following compounds falling under Formula I: 6α,16α,17α - trimethylprogesterone, 6α-fluoro-16α,17α-dimethylprogesterone, 6α,21 - difluoro - 16α,17α - dimethylprogesterone, 6α-fluoro-16α,17α-dimethyl-21-iodoprogesterone, 6α,16α,17α-trimethyl-21-iodoprogesterone.

To obtain the dihalogenated 17-methyl compounds of Formula II, 16α,17α-dimethylprogesterone is 11-hydroxylated microbiologically to the 16α,17α-dimethyl-11α-hydroxyprogesterone which, when dehydrated by dimethylformamide via an 11α-tosylate or mesylate will yield 9,11-dehydro intermediates such as 16α,17α-dimethyl-9(11)-dehydroprogesterone. Halogenation of the Δ$^{9,11}$-intermediates yields 9α,11β-dihalogeno analogs, as for example, 9α,11β - dichloro-6α,16α17α-trimethylprogesterone, 9α - bromo-6α,11β-difluoro-16α,17α-dimethylprogesterone, 9α-chloro-11β-fluoro-6α,16α,17α-trimethylprogesterone, and also, 9α,11β-dichloro-6α,21-difluoro-16α, 17α-dimethylprogesterone.

The 16-methyl-17-halogeno progesterone compounds of our invention are conveniently prepared by direct halogenation of the corresponding steroidal intermediate. For example, 16α - methyl - Δ$^5$ - pregnenolone (16α-methyl-5-pregnene-3β-ol-20-one) is brominated and subsequently treated with sodium iodide to give 16α-methyl-17α-bromo-5-pregnene-3β-ol-20-one. The alcohol function at carbon 3 is oxidized to the ketone and followed by treatment with a mild acid or mild alkali to shift the unsaturation from 5–6 to 4–5, yielding 16α-methyl-17α-bromoprogesterone. Also, bromination of the above 16α-methyl-Δ$^5$-pregnenolone to the corresponding 5,6-dibromide followed by chlorination with N-chloroacetamide gives the corresponding 17α-chloro derivative, e.g. 5,6-dibromo-17α-chloro-16α-methylprogesterone. Regeneration of the Δ$^{5(6)}$-unsaturation with sodium iodide followed by oxidation with chromic acid, and then acid or base treatment gives 16α-methyl-17α-chloroprogesterone.

Our novel 16-alkylprogesterones of Formulae I and II as well as the 1-dehydro, 19-nor, and 4,5-dihydro-1-dehydroallopregnene analogs of our invention (except those having a hydroxy group at C–17, which are useful as intermediates), are active progestational agents which are specific in their action and devoid of androgenic activity.

Progesterone and 17-caprooxy progesterone are known progestational agents, but their use as drugs has been limited to parenteral administration (and mainly intramuscular) since they are therapeutically ineffective when taken orally. Our substituted progesterones, on the other hand, are significantly more active than progesterone and 17-caprooxyprogesterone by the interamuscular route and, surprisingly, are also effective progestins by the oral route.

In addition to being active both orally and intramuscularly, our halogenated 16-alkylprogestins possess the added advantage of having a minimum effect on water, sodium or potassium metabolism. Thus, they may be administered without causing the usual side effects associated with electrolyte imbalance.

Our therapeutically active compounds are useful for the treatment of indications requiring progestational agents and particularly for the maintenance of pregnancy and the normalization of the menstrual cycle. When administered orally, our compounds are preferably used in the form of tablets containing from 10 to 100 mg. together with excipients such as starch or milk sugar. For subcutaneous and intramuscular administration, solutions or suspensions of our compounds with a non-toxic liquid vehicle are used. The dosage may vary with the indications being treated and may range from 10 to 25 mg. daily.

The 16-alkyl-17α-hydroxyprogesterones of Formulae I and II, and their 1-dehydro, 19-nor, and 4,5-dihydro-1-dehydroallopregnene analogs are valuable as intermediates in the preparation of the corresponding 17α-acetoxy analogs, which are active progestins. In addition, the 9α,11β - dihalogeno - 21-fluoro-16-alkyl-17α-hydroxyprogesterones of our invention, and particularly the 1-dehydro analogs, possess anti-inflammatory activity, thus rendering these compounds therepeutically valuable per se.

The following examples are illustrative of the procedures employed in preparing the compounds of this invention, but are not to be construed as limiting the scope thereof; the scope of our invention being limited only by the appended claims.

EXAMPLE 1

*16α-methyl-17α-hydroxyprogesterone*

A. 3β-HYDROXY-5,6-DICHLORO-16α-METHYLPREGNANE-20-ONE 3-ACETATE

A solution containing 5.6 g. of 3β-hydroxy-16α-methyl-5-pregnene-20-one 3-acetate and 3 ml. of pyridine in 150 ml. of carbon tetrachloride is cooled to −23° C. To this stirred solution is added dropwise over a ten minute period 1.16 g. of chlorine contained in 20 ml. of carbon tetrachloride. The reaction solution is then allowed to warm to approximately 15° C. while maintaining stirring. Methylene chloride (70 ml.) is added and the solutiton is washed successively with dilute hydrochloric acid, water, aqueous sodium bicarbonate, and then water. The organic phase is dried over magnesium sulfate, filtered and the filtrate evaporated to a residue which is crystallized from methanol to give 3β-hydroxy-5,6-dichloro-16α-methylpregnane-20-one 3-acetate, M.P. 195–196° C.

B. 3β,17α-DIHYDROXY-5,6-DICHLORO-16α-METHYL-PREGNANE-20-ONE

To 125 ml. of acetic anhydride is added 5.0 g. of the 5,6-dichloro-16α-methylpregnane of Example 1A and 1.0 g. of p-toluenesulfonic acid monohydrate. The solution is refluxed for 6 hours while maintaining a constant distillation rate so that there is collected during this time 100 ml. of distillate. The reaction solution is cooled and poured into 400 ml. of water with stirring. The aqueous mixture is extracted two times with 100 ml. portions of benzene. The combined benzene solution is washed two times with 50 ml. portions of water and one time with 50 ml. of a 2% solution of aqueous sodium acetate, then is dried over magnesium sulfate and filtered. The filtrate is concentrated in vacuo to a residue having a volume of about 70 ml. which is stirred for 19 hours with a mixture of 0.52 g. of sodium acetate in 12 ml. of commercial 40% peracetic acid. Excess peracetic acid is then destroyed by the dropwise addition of a solution of 15.6 g. of sodium sulfite in 53 ml. of water, while maintaining the temperature between 10–20° C. An additional 1.7 g. of sodium sulfite is added, and the mixture stirred until a starch-iodide test is negative. The benzene layer is separated, washed three times with water, and evaporated. To the resultant residue is added 200 ml. of methanol and 20 ml. of water containing 6.2 g. of potassium bicarbonate. The reaction solution is refluxed for 2 hours, and after the addition of 4 ml. of acetic acid, is concentrated in vacuo to a volume of about 40 ml., which is diluted with 800 ml. of water. A precipitate forms which is filtered and crystallized from ethyl acetate to give 3β,17α-dihydroxy-5,6-dichloro-16α-methylpregnane-20-one, M.P. 216–217° C.

C. 5,6-DICHLORO-16α-METHYL-17α-HYDROXYPREGNANE-3,20-DIONE

To a stirred solution of 13 g. of the 5,6-dichloro-16α-methylpregnane of Example 1B in 30 ml. of acetic acid and 4 ml. of water at 10° C. is first added over a 20 minute period a solution containing 0.34 g. of chromium trioxide in 5 ml. of acetic acid and 0.5 ml. of water, and then over a four-minute period 0.12 ml. of concentrated sulfuric acid. The reaction mixture is stirred for 1 hour, then diluted with water and extracted with chloroform. The combined chloroform extracts (150 ml.) are washed successively with water (70 ml.) three times with a 3% sodium bicarbonate solution and finally with 60 ml. of water. The chloroform solution is dried over magnesium sulfate, filtered and evaporated to a residue of 5,6-dichloro-16α-methyl-17α-hydroxypregnane-3,20-dione.

D. 16α-METHYL-17α-HYDROXY-5-PREGNENE-3,20-DIONE

To a solution of 3100 ml. ethanol and 572 ml. of water containing 11.5 g. of the 5,6-dichloro-16α-methylpregnane of Example 1C at reflux temperature and with stirring is added 100 g. of zinc dust. The reaction mixture is refluxed for one hour, filtered, and the filtrate evaporated to a residue which is triturated with water and, after drying, crystallized from acetone-hexane to give 16α-methyl-17α-hydroxy-5-pregnene-3,20-dione.

E. 16α-METHYL-17α-HYDROXYPROGESTERONE

To 8.1 g. of the 17α-hydroxy-5-pregnene of Example 1D in 90 ml. of methanol under nitrogen there is added a solution of 0.35 g. sodium hydroxide in 10 ml. of water. After 5 minutes at room temperature, the solution is rapidly brought to a boil, and then immediately neutralized with acetic acid (4 ml.) and chilled. The solution is concentrated to a volume of approximately 40 ml. and then 400 ml. of water is added. A precipitate results which is separated, dried, and crystallized from ether to give 16α-methyl-17α-hydroxyprogesterone.

EXAMPLE 2

*16α-methyl-17α-hydroxyprogesterone 17-acetate*

0.1 gram of 16α-methyl-17α-hydroxyprogesterone (the compound of Example 1) is dissolved in 1 cc. acetic acid and 0.2 ml. of trifluoroacetic anhydride and is heated at 80–90° C. for one hour, then is cooled and poured into ice water, and extracted with 50 ml. methylene chloride. The organic phase is washed with 3% aqueous sodium carbonate, and then two times with water, dried over magnesium sulfate, filtered, evaporated to a residue which is crystallized from aqueous methanol to give 16α-methyl-17α-hydroxyprogesterone 17-acetate.

In similar manner, by substituting other lower alkanoic acids such as propionic or valeric for acetic acid in the above procedure, the corresponding 17-lower alkanoates are obtained, such as the 17-propionate and 17-valerate, respectively, of 16α-methyl-17α-hydroxyprogesterone.

EXAMPLE 3

*16α-methyl-17α-hydroxyprogesterone 17-caproate*

The compound of Example 1 (16α-methyl-17α-hydroxyprogesterone) (0.1) is dissolved in 1 ml. of caproic acid and 0.2 ml. of trifluoroacetic anhydride and heated at 80–90° C. for 1 hour. The reaction solution is cooled, poured into 30 ml. ice water, and extracted with methylene chloride. The organic solution is washed with aqueous sodium carbonate (3%) and water, dried over magnesium sulfate, filtered and evaporated to a residue which is crystallized from pentane to give 16α-methyl-17α-hydroxyprogesterone 17-caproate.

EXAMPLE 4

*6β,16α-dimethyl-17α-hydroxyprogesterone*

A. 16α-METHYL-17α-HYDROXYPROGESTERONE 3,20-BISETHYLENE KETAL

16α-methyl-17α-hydroxyprogesterone (30 g.) (prepared as in Example 1) in 1 liter of dry benzene and 390 ml. of ethylene glycol is refluxed under a Dean-Stark separator for 22 hours in the presence of 0.5 g. of p-toluenesulfonic acid. After the addition of 0.6 g. of sodium hydroxide in 20 ml. of methanol the reaction mixture is diluted with water and the organic layer separated. The benzene layer is then washed with 5% aqueous sodium carbonate and then water, and concentrated in vacuo to a residue which is crystallized from benzene-hexane to give 16α-methyl-17α-hydroxy progesterone 3,20-bisethylene ketal.

B. 5α,6α-EPOXY-16α-METHYL-17α-HYDROXYPREGNANE 3,20-BISETHYLENE KETAL

A solution of 21 g. of the bisethylene ketal of Example 4A in 300 ml. of chloroform containing 3 drops of pyridine is reacted wtih a solution of 14.9 g. of monoperphthalic acid in 190 ml. of ether at 0° C. The mixture is allowed to stand at 0° C. for 24 hours, then diluted with ether and washed 4 times with 5% aqueous sodium bicarbonate and one time with water. The solution is dried over magnesium sulfate, filtered, and evaporated in vacuo to a residue which is chromatographed on Florisil. The ether eluates are concentrated to a residue which is crystallized from acetone-hexane, to give 5α,6α-epoxy-16α-methyl-17α-hydroxypregnane 3,20-bisethylene ketal.

C. 6β,16α-DIMETHYL-17α-HYDROXYPROGESTERONE

The 5α,6α-epoxy of Example 4B (11 g.) is dissolved in 220 ml. of tetrahydrofuran and 220 ml. of benzene and added to methyl magnesium iodide prepared from 5.3 g. of magnesium and 15.6 ml. of methyl iodide in 210 ml. of ether. The reaction mixture is heated to distill off the ether and then refluxed for 18 hours. An aqueous ammonium chloride solution is added and the organic layer separated, washed with water and concentrated. The resultant residue is dissolved in 550 ml. of acetic acid and 40 ml. water and the solution refluxed for 2 hours, then diluted with water and extracted with methylene chloride. The organic layer is washed to neutrality with water, dried over sodium sulfate and then evaporated to a residue which is crystallized from acetone-hexane to give 6β,16α-dimethyl-17α-hydroxy-progesterone.

EXAMPLE 5

6α,16α-dimethyl-17α-hydroxyprogesterone

A solution of 150 mg. of the 6β-methylprogesterone of Example 4 in chloroform is cooled to −10° C., and a stream of anhydrous hydrogen chloride is passed through the solution during a period of 2 hours while maintaining the temperature at −10° C. The chloroform solution is washed with aqueous sodium bicarbonate and water, then dried and evaporated to a residue which is crystallized from ethyl acetate-hexane to give 6α,16α-dimethyl-17α-hydroxyprogesterone.

EXAMPLE 6

6α,16α-dimethyl-17α-hydroxyprogesterone 17-acetate

6α,16α-dimethyl-17α-hydroxyprogesterone (0.1 g.) (the compound of Example 5) is treated with 0.2 g. trifluoroacetic anhydride and 1 ml. of acetic acid in a manner similar to the procedure outlined in Example 2. The resultant product is isolated in the described manner and recrystallized from aqueous methanol to give 6α,16α-dimethyl-17α-hydroxyprogesterone 17-acetate.

EXAMPLE 7

6α,16α-dimethyl-17α-hydroxyprogesterone 17-caproate

6α,16α-dimethyl-17α-hydroxyprogesterone (0.1 g), the compound of Example 5, is treated with caproic acid and trifluoroacetic anhydride in a manner similar to the procedure of Example 3 to give 6α,16α-dimethyl-17α-hydroxyprogesterone 17-caproate.

EXAMPLE 8

6α,16α-dimethyl-17α-hydroxy-21-iodoprogesterone

To a solution of 6α,16α-dimethyl-17α-hydroxyprogesterone (prepared as in Example 4) (330 mg.) dissolved in 2.5 ml. of tetrahydrofuran and 1.5 ml. methanol there is added 482 mg. of iodine and 483 mg. of finely powdered calcium oxide. The mixture is stirred for 5 hours and then poured into 55 ml. of cold water containing 2.2 ml. acetic acid, and extracted with chloroform. The organic extracts are combined, washed with water, dried over magnesium sulfate, filtered, and evaporated to a residue which is crystallized from acetone to give 6α,16α-dimethyl-17α-hydroxy-21-iodoprogesterone.

EXAMPLE 9

6α,16α-dimethyl-17α-hydroxy-21-iodoprogesterone 17-acetate

In the manner described in Example 2, the 17α-hydroxyprogesterone of Example 8 is esterified by means of acetic acid and trifluoroacetic anhydride and the resultant product isolated and purified to give 6α,16α-dimethyl-17α-hydroxy-21-iodoprogesterone 17-acetate.

EXAMPLE 10

6α,16α-dimethyl-17α-hydroxy-21-fluoroprogesterone

6α,16α - dimethyl - 17α - hydroxy - 21 - iodoprogesterone (0.24 g.) (prepared as in Example 8) is dissolved in 40 ml. of moist acetonitrile, and there is added a solution of 0.1 g. silver fluoride in 0.2 ml. of water. The mixture is stirred overnight at approximately 30–35° C., then filtered, and the filtrate evaporated to an almost dry residue. Methylene chloride is added to the residue, and the organic solution is washed with 3 portions of water, dried over magnesium sulfate, filtered, evaporated to a residue which is crystallized from acetone-hexane to give 6α,16α-dimethyl-17α-hydroxy-21-fluoroprogesterone.

EXAMPLE 11

6α,16α-dimethyl-17α-hydroxy-21-fluoroprogesterone 17-acetate

In a manner similar to that described in Example 2, 0.14 g. of 6α,16α-dimethyl-17α-hydroxy-21-fluoroprogesterone (the compound of Example 10) is reacted with trifluoroacetic anhydride and acetic acid, and the resultant product isolated and purified to give 6α,16α-dimethyl-17α-hydroxy-21-fluoroprogesterone 17-acetate.

In like manner, by substituting other lower alkanoic acids such as propionic and butyric for acetic acid in the above procedure, the corresponding 17-lower alkanoates are obtained, i.e. the 17-propionate and 17-butyrate, respectively, of 6α,16α-dimethyl-17α-hydroxy-21-fluoroprogesterone.

EXAMPLE 12

6β,16α-dimethylprogesterone

A. 16α-METHYLPROGESTERONE 3,20-BISETHYLENE KETAL

In the manner of Example 4A, 30 g. of 16α-methylprogesterone is reacted with ethylene glycol in the presence of p-toluenesulfonic acid, and the resultant product isolated and purified to give 16α-methylprogesterone 3,20-bisethylene ketal.

B. 5α,6α-EPOXY-16α-METHYLPREGNANE-3,20-DIONE 3,20-BISETHYLENE KETAL

The bisethylene ketal of Example 12A (20 g.) is dissolved in 300 ml. chloroform and reacted with 14.5 g. monoperphthalic acid in the manner described in Example 4B, and the resultant product isolated and purified to give 5α,6α-epoxy-16α-methylpregnane-3,20-dione 3,20-bisethylene ketal.

C. 6β,16α-DIMETHYLPROGESTERONE

The 5α,6α-epoxyprogesterone of Example 12B is reacted with methyl megnesium iodide in the manner described in Example 4C. The resultant product is isolated in the described manner and crystallized from acetone-hexane to give 6β,16α-dimethylprogesterone.

EXAMPLE 13

6α,16α-dimethylprogesterone 150 mg. of 6β,16α-dimethylprogesterone (the compound of Example 12) in chloroform is reacted with anhydrous hydrogen chloride in the manner described in Example 5. The resultant product is isolated and purified in the described manner to give 6α,16α-dimethylprogesterone.

EXAMPLE 14

16α-methyl-21-iodoprogesterone

16α-methylprogesterone in tetrahydrofuran and methanol is reacted with iodine and calcium oxide according to the procedure of Example 8. The resultant product is isolated in the described manner and crystallized from ether-hexane to give 16α-methyl-21-iodoprogesterone.

EXAMPLE 15

*16α-methyl-21-fluoroprogesterone*

16α-methyl-21-iodoprogesterone (the compound of Example 14) is reacted with silver fluoride in moist acetonitrile in the manner of Example 10. The resultant product is isolated in the described manner and crystallized from isopropylether-hexane to give 16α-methyl-21-fluoroprogesterone.

EXAMPLE 16

*6β-fluoro-16α-methyl-17α-hydroxyprogesterone 17-acetate*

A. 6β-FLUORO-16α-METHYL-17α-HYDROXY-PROGESTERONE

To a stirred solution of 400 mg. of the oxidopregnane of Example 4B in 19 ml. of methylene chloride cooled to 2° C. there is added 2 ml. of 48% aqueous hydrofluoric acid. After 4 hours, the reaction mixture is poured into ice and aqueous sodium bicarbonate. Additional methylene chloride is added, the organic phase is separated, washed with water, dried and evaporated to a residue. Acetic acid (50 ml.) and water (2 ml.) are added and the solution is refluxed for one hour, then diluted with water and extracted with methylene chloride. The organic layer is separated and washed with water, dried over magnesium sulfate, filtered and evaporated to a solid which is crystallized from acetone-hexane to give 6β-fluoro-16α-methyl-17α-hydroxyprogesterone.

B. 6β-FLUORO-16α-METHYL-17α-HYDROXYPROGESTERONE 17-ACETATE

6β-fluoro-16α-methyl-17α-hydroxyprogesterone (the compound of Example 16A) is esterified with acetic acid and trifluoroacetic anhydride in the manner described in Example 2 to give 6β-fluoro-16α-methyl-17α-hydroxyprogesterone 17-acetate.

Similarly, by substituting a lower alkanoic acid such as caproic acid or acetic acid in the above procedure, the corresponding 17-lower alkanoate is obtained, i.e. 6β-fluoro-16α-methyl-17α-hydroxyprogesterone 17-caproate.

EXAMPLE 17

*6α-fluoro-16α-methyl-17α-hydroxyprogesterone 17-actate*

A. 6α-FLUORO-16α-METHYL-17α-HYDROXY-PROGESTERONE

A solution of 300 mg. of the 6β-fluoroprogesterone of Example 16 in 35 ml. chloroform is cooled to −10° C., and a stream of anhydrous hydrogen chloride is passed through the solution during a period of 2 hours while at a solution temperature of −10° C. The chloroform solution is washed with aqueous bicarbonate and water, then dried and evaporated to a residue which is crystallized from ethyl acetate to give 6α-fluoro-16α-methyl-17α-hydroxyprogesterone.

B. 6α-FLUORO-16α-METHYL-17α-HYDROXYPROGESTERONE 17-ACETATE

6α-fluoro-16α-methyl-17α-hydroxyprogesterone (the compound of Example 17A) is esterified with acetic acid and trifluoroacetic anhydride in the manner described in Example 2 to give 6α-fluoro-16α-methyl-17α-hydroxyprogesterone 17-acetate.

Similarly, by substituting a lower alkanoic acid such as caproic acid for acetic acid in the above procedure, the corresponding 17-lower alkanoate is obtained, i.e. 6α-fluoro-16α-methyl-17α-hydroxyprogesterone 17-caproate.

EXAMPLE 18

*6β-fluoro-16α-methylprogesterone*

One gram of 5α,6α-epoxy-16α-methylpregnane-3,20-dione 3,20-bisethylene ketal (the compound of Example 12B) is reacted with hydrogen fluoride and then hydrolyzed with aqueous acetic acid in the manner described in Example 16A. The resultant product is isolated in the described manner and crystallized from ether-hexane to give 6β-fluoro-16α-methylprogesterone.

EXAMPLE 19

*6α-fluoro-16α-methylprogesterone*

6β-fluoro-16α-methylprogesterone (the compound of Example 18) is reacted with hydrogen chloride in chloroform in the manner of Example 17A. The resultant product is isolated in the described manner and crystallized from isopropyl ether to give 6α-fluoro-16α-methylprogesterone.

EXAMPLE 20

*16α-methyl-4,9(11)-pregnadiene-3,20-dione*

A. 11α-HYDROXY-16α-METHYLPROGESTERONE

A culture of *Rhizopus nigricans* (A.T.C.C. 6227b) is maintained on 1% yeast extract, 1% cerelose agar at 28° C. Ten 300 ml. Erlenmeyer flasks each containing 100 ml. aliquots of the following sterile medium: 20 g. cerelose, 5 g. proteose peptone No. 3, 5 g. soybean meal, 5 g. sodium chloride, 5 g. monopotassium diacid phosphate and 3 g. yeast extract in sufficient water to provide a liter of solution and adjusted to pH 6.8, are inoculated with a spore suspension of *Rhizopus nigricans* from the agar slants and incubated on a shaker at 280 r.p.m. at 28° C. From 24 to 48 hours after inoculation, 25 mg. of 16α-methylprogesterone in 100 ml. of methanol are added to each flask, and shaken at about 28° C. for a period of one to two days. The flasks are removed from the shaker when the conversion to the 11α-hydroxy steroid is completed, as indicated by a paper chromatography technique which is that outlined by Bush, Journal of Biochemistry 50, 370 (1952), and modified by Shull, "Paper Chromatography of Steroid Fermentation Products," 126th meeting of the American Chemical Society, September 12–17, 1954, New York, New York, Section 9A, paper No. 24. The contents of the flasks are combined and extracted with methylene chloride. The extracts are dried over sodium sulfate, filtered, and evaporated to a residue which is crystallized from acetone-hexane to give 11α-hydroxy-16α-methylprogesterone.

B. 11α-HYDROXY-16α-METHYLPROGESTERONE 11-p-TOLUENESULFONATE

A solution of 5 g. of 11α-hydroxy-16α-methylprogesterone (the compound of Example 20A) in 20 ml. chloroform and 25 ml. of dry pyridine is chilled in an ice bath and 6 g. of p-toluenesulfonyl chloride is added in small portions. The reaction mixture is stirred in the cold for 90 minutes, then allowed to warm to and remain at room temperature for 20 hours. The mixture is then poured into ice-water, stirred thoroughly and extracted with chloroform. The organic solution is washed with water, dried over magnesium sulfate, filtered, and concentrated in vacuo to a residue which is triturated with a small quantity of ethanol and filtered to give 11α-hydroxy-16α-methylprogesterone 11-p-toluenesulfonate. This compound is used without further purification in the procedure immediately following.

C. 16α-METHYL-4,9(11)-PREGNADIENE-3,20-DIONE

To a solution of 7.5 g. of anhydrous sodium acetate in 80 ml. of acetic acid, heated to about 105° C., is added 5 g. of the 11-p-toluenesulfonate of Example 20B. The solution is refluxed for 45 minutes, then chilled in ice and diluted with cold water. The resultant precipitate is separated by filtration, washed with dilute acetic acid, dried and crystallized from isopropyl ether to give 16α-methyl-4,9(11)-pregnadiene-3,20-dione.

EXAMPLE 21

*9α,11β-dichloro-16α-methylprogesterone*

To a solution of 1.0 g. of 16α-methyl-4,9(11)-pregnadiene-3,20-dione (the compound of Example 20) dissolved in 35 ml. of carbon tetrachloride containing 0.80 ml. of pyridine at −20° C. is added 0.24 g. of chlorine contained in 3 ml. carbon tetrachloride. The mixture is stirred at −20° C. for 20 minutes, then allowed to warm to 15° C. over a 45 minute period. A dilute aqueous sodium thiosulfate solution is added to remove any unreacted chlorine, the organic layer phase is separated, washed with water, dried, evaporated to a residue which is crystallized from acetone-hexane to give 9α,11β-dichloro-16α-methylprogesterone.

EXAMPLE 22

*9α-bromo-11β-fluoro-16α-methylprogesterone*

To a solution of 0.5 g. of 16α-methyl-4,9(11)-pregnadiene-3,20-dione (the compound of Example 20) and 0.242 mg. of freshly crystallized N-bromoacetamide in 17 ml. of acetic acid is added a solution of 0.27 g. of hydrogen fluoride contained in 11 ml. of acetic acid. The solution is stirred at room temperature for 3 hours, then poured into ice-water. The resultant precipitate is separated from the supernatant liquid by decantation. The precipitate thus separated is dissolved in acetone-ether and the resultant solution dried over magnesium sulfate, and filtered. The acetone-ether filtrate is filtered through a column of magnesium silicate which has been saturated with ether. The column is eluted with ether, then the combined eluates are evaporated to a residue which is crystallized from methylene chloride-hexane to give 9α-bromo-11β-fluoro-16α-methylprogesterone.

EXAMPLE 23

*9α-iodo-11β-chloro-16αmethylprogesterone*

A solution of 16α-methyl-4,9(11)-pregnadiene - 3,20-dione (1.0 g.) (prepared as in Example 20) in 50 ml. of tetrahydrofuran is chilled to 0° C., 4 drops of perchloric acid and 4 g. of lithium chloride are added, followed by the dropwise addition of a solution of 465 mg. of iodine monochloride in 6 ml. of tetrahydrofuran. The reaction mixture is stirred at room temperature for 17 hours, then poured into ice-water. The resultant precipitate is separated by decantation of the supernatant liquid and then triturated with isopropyl ether followed by crystallization from acetone-hexane to give 9α-iodo-11β-chloro-16α-methylprogesterone.

EXAMPLE 24

*9α-chloro-11β-fluoro-16α-methylprogesterone*

To a solution of 250 mg. of 16α-methyl-4,9(11)-pregnadiene-3,20-dione (the compound of Example 20) in 15 ml. of diethylacetic acid is added 135 mg. of N-chlorosuccinimide and then a solution of 320 mg. of hydrogen fluoride in 1.6 ml. of a mixture of tetrahydrofuran and chloroform. The reaction mixture is stirred for 48 hours at room temperature, then poured into an aqueous sodium carbonate solution. The resulting mixture is extracted with methylene chloride. The organic extracts are combined, washed with water, dried over magnesium sulfate and evaporated to a residue which is dissolved in ether and chromatographed on silica gel. The substance eluted with 10–40% ether-in-hexane is crystallized from acetone-hexane to give 9α-chloro-11β-fluoro-16α-methylprogesterone.

EXAMPLE 25

*9α-bromo-11β-chloro-16α-methylprogesterone*

To a solution of 1 g. of 16α-methyl-4,9(11)-pregnadiene-3,20-dione (the compound of Example 20) in 55 ml. of acetic acid containing 5 g. of lithium chloride is added 0.485 g. of freshly crystallized N-bromoacetamide. The mixture is stirred at room temperature while a slow stream of gaseous hydrogen chloride is passed over the surface until the solution begins to darken (15–35 seconds). The gas is removed and the solution is stirred in the dark at room temperature for 20 minutes. The reaction solution is then poured into 1200 ml. of ice water. A precipitate forms which is filtered and crystallized from acetone-hexane to give 9α-bromo-11β-chloro-16α-methylprogesterone.

EXAMPLE 26

*6β,16α-dimethyl-11α-hydroxyprogesterone*

A. 11α-HYDROXY-16α-METHYLPROGESTERONE 3,20-BISETHYLENE KETAL

In the manner described in Example 4A, 11α-hydroxy-16α-methylprogesterone (the compound of Example 20A) is reacted with ethylene glycol and p-toluenesulfonic acid and the resultant product isolated and crystallized from acetone-hexane to give 11α-hydroxy-16α-methylprogesterone 3,20-bisethylene ketal.

B. 5α,6α-EPOXY-11α-HYDROXY-16α-METHYLPREGNANE-3,201DIONE 3,20-BISETHYLENE KETAL

In the manner described in Example 4B, the 3,20-bisethylene ketal of Example 26A is reacted with perphthalic acid. The resultant product is isolated in the described manner and crystallized from acetone-hexane to give 5α,6α-epoxy-11α-hydroxy-16α-methylpregnane - 3,20 - dione 3,20-bisethylene ketal.

C. 6β,16α-DIMETHYL-5α,11α-DIHYDROXYPREGNANE-3,20-DIONE

Eleven grams of the 5α,6α-epoxypregnane of Example 26B is dissolved in 220 ml. of tetrahydrofuran and 220 ml. of benzene. The resultant solution is added to the Grignard reagent prepared from 5.3 g. of magnesium and 15.6 ml. of methyl iodide in 210 ml. of ether. The reaction mixture is heated to distill off the ether and then is refluxed for 18 hours. Aqueous ammonium chloride solution is added and the organic layer is separated, washed with water and concentrated in vacuo to a residue which is dissolved in 150 ml. of methanol. Ten grams of oxalic acid is added and the reaction mixture is refluxed for 30 minutes. The solution is then diluted with water and extracted with methylene chloride. The organic extract is washed with water, dried over magnesium sulfate, filtered and concentrated to a residue comprising 6β,16α-dimethyl-5α,11α-dihydroxypregnane - 3,20 - dione. This product is used without further purification in the following procedure.

D. 6β,16α-DIMETHYL-11α-HYDROXYPROGESTERONE

The 5α-hydroxy-6β-methylpregnane prepared in Example 26C is dissolved in 550 ml. of acetic acid and 40 ml. of water. The solution is refluxed for 2 hours, then diluted with water and extracted with methylene chloride. The organic layer is separated, washed to neutrality with water, dried over magnesium sulfate, filtered and evaporated to a residue which is crystallized from ether-hexane to give 6β,16α-dimethyl-11α-hydroxyprogesterone.

EXAMPLE 27

*6α,16α-dimethyl-11α-hydroxyprogesterone*

A solution of 150 mg. of 6β,16α-dimethyl-11α-hydroxyprogesterone (the compound of Example 26) is dissolved in chloroform and reacted with anhydrous hydrogen chloride in the manner of Example 5. The resultant product is isolated and purified in the described manner to give 6α,16α-dimethyl-11α-hydroxyprogesterone.

Alternatively, the compound of this example is prepared by subjecting 6α,16α-dimethylprogesterone (the compound of Example 13) to a culture of *Rhizopus nigricans* A.T.C.C. 6227b in the manner described in Example 20A.

EXAMPLE 28

*6α,16α-dimethyl-4,9(11)-pregnadiene-3,20-dione*

A. 6α,16α-DIMETHYL-11α-HYDROXYPROGESTERONE 11-p-TOLUENESULFONATE

Five grams of 6α,16α-dimethyl-11α-hydroxyprogesterone (the compound of Example 27) is reacted with p-toluenesulfonyl chloride in the manner of Example 20B. The resultant product is isolated in the described manner and crystallized from methanol to give 6α,16α-dimethyl-11α-hydroxyprogesterone 11-p-toluenesulfonate.

B. 6α,16α-DIMETHYL-4,9(11)-PREGNADIENE-3,20-DIONE

A solution of 5 g. of the 11α-p-toluenesulfonate prepared in Example 28A in acetic acid is reacted with sodium acetate at reflux temperature in the manner described in Example 20C. The resultant product is isolated and purified in the described manner to give 6α,16α-dimethyl-4,9(11)-pregnadiene-3,20-dione.

EXAMPLE 29

*6α,16α-dimethyl-9α,11β-dichloroprogesterone*

One gram of 6α,16α-dimethyl-4,9(11)-pregnadiene-3,20-dione (the compound of Example 28) is reacted with chlorine gas in carbon tetrachloride in the presence of 0.8 ml. of pyridine in the manner described in Example 21. The resultant product is isolated in the described manner and crystallized from acetone-hexane to give 6α,16α-dimethyl-9α,11β-dichloroprogesterone.

EXAMPLE 30

*6α,16α,dimethyl-9α-chloro-11β-fluoroprogesterone*

In the manner of Example 24, 255 mg. of 6α,16α-dimethyl-4,9(11)-pregnadiene-3,20-dione (the compound of Example 28) is reacted with 135 mg. of N-chlorosuccinimide and 320 mg. of hydrogen fluoride in diethylacetic acid. The resultant product is isolated in the described manner and crystallized from acetone-hexane to give 6α,16α-dimethyl-9α-chloro-11β-fluoroprogesterone.

EXAMPLE 31

*6α-fluoro-16α-methyl-4,9(11)-pregnadiene-3,20-dione*

A. 5α,11α-DIHYDROXY-6β-FLUORO-16α-METHYL-PREGNANE-3,20-DIONE 460 mg. of 5α,6α-epoxy-11α-hydroxy-16α-methylpregnane-3,20-dione 3,20-bisethylene ketal (the compound of Example 26B) is dissolved in 19 ml. of methylene chloride and at 2° C. with stirring, there is added 2 ml. of 48% aqueous hydrofluoric acid. After 4 hours, the reaction mixture is poured into ice and aqueous sodium bicarbonate. Additional methylene chloride is added and the organic phase is separated, washed with water, dried over magnesium sulfate, filtered and evaporated to a residue to which is added 3 g. of oxalic acid in 50 ml. of methanol. The solution is refluxed for 30 minutes then diluted with water and extracted with methylene chloride. The extracts are combined, washed with water, dried over magnesium sulfate, filtered and concentrated in vacuo to a residue comprising 5α,11α-dihydroxy-6β-fluoro-16α-methylpregnane-3,20-dione.

This product is used without further purification in the following procedure.

B. 6β-FLUORO-11α-HYDROXY-16α-METHYL-PROGESTERONE

To the 5α-hydroxy-6α-fluoropregnane prepared in Example 31A, is added 50 ml. of acetic acid, 2 ml. of water and the solution is refluxed for one hour, then diluted with water and extracted with methylene chloride. The organic extracts are washed with water, dried over magnesium sulfate, filtered and evaporated to a residue which is crystallized from acetone-hexane to give 6β-fluoro-11α-hydroxy-16α-methylprogesterone.

C. 6α-FLUORO-11α-HYDROXY-16α-METHYL PROGESTERONE 300 mg. of 6β-fluoro-11α-hydroxy-16α-methylprogesterone (the compound of Example 31B) dissolved in chloroform is reacted with anhydrous hydrogen chloride in the manner of Example 17A. The resultant product is isolated and purified in the described manner to give 6α-fluoro-11α-hydroxy-16α-methylprogesterone.

D. 6α-FLUORO-11α-HYDROXY-16α-METHYLPROGESTERONE 11-p-TOLUENESULFONATE

Five grams of the 11α-hydroxyprogesterone of Example 31C is reacted with p-toluenesulfonyl chloride in the manner of Example 20B. The resultant product is isolated in the described manner and crystallized from methanol to give 6α-fluoro-11α-hydroxy-16α-methylprogesterone 11-p-toluenesulfonate.

E. 6α-FLUORO-16α-METHYL-4,9(11)-PREGNADIENE-3,20-DIONE

In the manner of Example 20C, the 11-p-toluenesulfonate of Example 31D is reacted with sodium acetate in acetic acid and the resultant product isolated and crystallized from isopropyl ether to give 6α-fluoro-16α-methyl-4,9(11)-pregnadiene-3,20-dione.

EXAMPLE 32

*6α-fluoro-9α-bromo-11β-chloro-16α-methylprogesterone*

One gram of 6α-fluoro-16α-methyl-4,9(11)-pregnadiene-3,20-dione (the compound of Example 31) is dissolved in acetic acid and reacted with N-bromoacetamide and lithium chloride in the manner of Example 25. The resultant product is isolated in the described manner and crystallized from acetone-hexane to give 6α-fluoro-9α-bromo-11β-chloro-16α-methylprogesterone.

EXAMPLE 33

*6α-fluoro-9α,11β-dichloro-16α-methylprogesterone*

One gram of 6α-fluoro-16α-methyl-4,9(11)-pregnadiene-3,20-dione (the compound of Example 31) is reacted with chlorine gas in carbon tetrachloride in the presence of pyridine in the manner of Example 21. The resultant product is isolated in the described manner and crystallized from acetone-hexane to give 6α-fluoro-9α,11β-dichloro-16α-methylprogesterone.

EXAMPLE 34

*16α-methyl-21-iodo-4,9(11)-pregnadiene-3,20-dione*

340 mg. of 16α-methyl-4,9(11)-pregnadiene-3,20-dione (the compound of Example 20C) is reacted with iodine and calcium oxide in the manner of Example 8. The resultant product is isolated in the described manner and crystallized from aqueous acetone to give 16α-methyl-21-iodo-4,9(11)-pregnadiene-3,20-dione.

EXAMPLE 35

*16α-methyl-21-fluoro-4,9(11)-pregnadiene-3,20-dione*

0.19 g. of 16α-methyl-21-iodo-4,9(11)-pregnadiene-3,20-dione (the compound of Example 34) dissolved in moist acetonitrile is reacted with 0.1 g. of silver fluoride in 0.2 ml. of water in the manner described in Example 10. The resultant product is isolated in the described manner and crystallized from isopropyl ether to give 16α-methyl-21-fluoro-4,9(11)-pregnadiene-3,20-dione.

EXAMPLE 36

*9α-,11β-dichloro-21-fluoro-16α-methylprogesterone*

1.2 g. of 16α-methyl-21-fluoro-4,9(11)-pregnadiene-3,20-dione (the compound of Example 35) is reacted with chloride gas in carbon tetrachloride in the presence of pyridine in the manner of Example 21. The resultant product is isolated in the described manner and crystallized from acetone-hexane to give 9α,11β-dichloro-21-fluoro-16α-methylprogesterone.

EXAMPLE 37

*9α-chloro-11β,21-difluoro-16α-methylprogesterone*

250 mg. of 16α-methyl-21-fluoro-4,9(11)-pregnadiene-3,20-dione (the compound of Example 35) is reacted with 135 mg. of N-chlorosuccinimide and 320 mg. of hydrogen fluoride in the manner described in Example 24. The resultant product is isolated as described and crystallized from acetone-hexane to give 9α-chloro-11β,21-difluoro-16α-methylprogesterone.

EXAMPLE 38

*6α,16α-dimethyl-17α-hydroxy-4,9(11)-pregnadiene-3,20-dione*

A. 11α,17α-DIHYDROXY-16α-METHYLPROGESTERONE

16α - methyl-17α-hydroxyprogesterone (the compound of Example 1) is subjected to the action of a culture of *Rhizopus nigricans* and the resultant product isolated in the manner described in Example 20A. The isolated product is crystallized from acetone-hexane to give 11α,17α-dihydroxy-16α-methylprogesterone.

B. 11α,17α-DIHYDROXY-16α-METHYLPROGESTERONE 3,20-BISETHYLENE KETAL

In the manner of Example 4A, 11α,17α-dihydroxy-16α-methylprogesterone (the compound of Example 38A) is reacted with ethylene glycol in the presence of p-toluenesulfonic acid in benzene and isolated and purified to give 11α,17α-dihydroxy-16α-methylprogesterone 3,20-bisethylene ketal.

C. 5α,6α-EPOXY-11α,17α-DIHYDROXY-16α-METHYLPREGNANE-3,20-DIONE 3,20-BISETHYLENE KETAL

The 3,20-bisethylene ketal of Example 38B is reacted with perphthalic acid and the resultant product isolated in the maner of Example 4B. The isolated product is crystallized from benzene-hexane to give 5α,6α-epoxy-11α,17α - dihydroxy-16α-methylpregnane-3,20-dione 3,20-bisethylene ketal.

D. 5α,11α,17α-TRIHYDROXY-6β,16α-DIMETHYL-PREGNANE-3,20-DIONE

In the manner of Example 26C, the 5α,6α-epoxypregnane of Example 38C is reacted with methyl magnesium iodide and the resultant bisethylene ketal derivative is hydrolyzed with oxalic acid in methanol and the resultant product isolated and purified to give 5α,11α,17α-trihydroxy-6β,16α-dimethylpregnane-3,20-dione.

E. 6β,16α-DIMETHYL-11α,17α-DIHYDROXY PROGESTERONE

In the manner described in Example 26D, the 5α-hydroxy-6β-methylpregnane of Example 38D is reacted with refluxing aqueous acetic acid and the resultant product isolated and purified to give 6β,16α-dimethyl-11α,17α-dihydroxyprogesterone.

F. 6α,16α-DIMETHYL-11α,17α-DIHYDROXY PROGESTERONE

6β,16α - dimethyl-11α,17α-dihydroxyprogesterone (the compound of Example 38E) is reacted with anhydrous hydrogen chloride in chloroform and the resultant product isolated and purified in the manner described in Example 5 to give 6α,16α-dimethyl-11α,17α-dihydroxyprogesterone.

G. 6α,16α-DIMETHYL-11α,17α-DIHYDROXYPROGESTERONE 11-p-TOLUENESULFONATE

The 11α-hydroxyprogesterone of Example 38F is reacted with p-toluenesulfonyl chloride in chloroform and in the presence of pyridine, and the resultant product isolated and purified in the manner described in Example 20B to give 6α,16α-dimethyl-11α,17α-dihydroxyprogesterone 11-p-toluenesulfonate.

H. 6α,16α-DIMETHYL-17α-HYDROXY-4,9(11)-PREGNADIENE-3,20-DIONE

The 11-p-toluenesulfonate of Example 38G is reacted with sodium acetate and acetic acid and the resultant product isolated in the manner described in Example 20C. The isolated product is crystallized from isopropyl ether to give 6α,16α - dimethyl-17α-hydroxy-4,9(11)-pregnadiene-3,20-dione.

EXAMPLE 39

*6α,16α-dimethyl-17α-hydroxy-4,9(11)-pregnadiene-3,20-dione 17-acetate*

6α,16α-dimethyl - 17α - hydroxy-4,9(11)-pregnadiene-3,20-dione (the compound of Example 38) is esterified by means of acetic acid and trifluoroacetic anhydride in the manner described in Example 2 to give 6α,16α-dimethyl-17α-hydroxy-4,9(11)-pregnadiene - 3,20-dione 17-acetate.

Similarly, by substituting other lower alkanoic acids such as valeric and butyric for acetic acid in the above procedure, the corresponding 17-lower alkanoates are obtained, i.e. the 17-valerate and 17-butyrate of 6α,16α-dimethyl-17α-hydroxy-4,9(11)-pregnadiene-3,20-dione.

EXAMPLE 40

*6α,16α-dimethyl-9α,11β-dichloro-17α-hydroxyprogesterone 17-acetate*

A. 6α,16α-dimethyl-17α-hydroxy-4,9(11)-pregnadiene-3,20-dione 17-acetate (the compound of Example 39) is reacted with chlorine in carbon tetrachloride and in the presence of pyridine in the manner of Example 21. The resultant product is isolated in the described manner and crystallized from acetone-hexane to give 6α,16α-dimethyl-9α,11β-dichloro-17α-hydroxyprogesterone 17-acetate.

Alternatively, the compound of this example is prepared according to the following procedures B and C.

B. 6α,16α-DIMETHYL-9α,11β-DICHLORO-17α-HYDROXYPROGESTERONE

In the manner described in Example 21, 6α,16α-dimethyl-17α-hydroxy-4,9(11)-pregnadiene-3,20-dione (the compound of Example 38) is reacted with chlorine in carbon tetrachloride and in the presence of pyridine and the resultant product isolated and purified to give 6α,16α-dimethyl-9α,11β-dichloro-17α-hydroxyprogesterone.

C. 6α,16α-DIMETHYL-9α,11β-DICHLORO-17α-HYDROXYPROGESTERONE 17-ACETATE

In the manner described in Example 2, the 17α-hydroxyprogesterone of Example 40B is reacted with acetic acid and trifluoroacetic anhydride and the resultant product isolated and purified to give 6α,16α-dimethyl-9α,11β-dichloro-17α-hydroxyprogesterone 17-acetate.

EXAMPLE 41

*6α,16α-dimethyl-9α-bromo-11β-chloro-17α-hydroxyprogesterone 17-acetate*

A. 6α,16α-dimethyl-17α-hydroxy-4,9(11)-pregnadiene-3,20-dione 17-acetate (the compound of Example 39) in acetic acid is reacted with lithium chloride, N-bromoacetamide and anhydrous hydrogen chloride in the manner of Example 25. The resultant product is isolated in the described manner and crystallized from acetone-hexane to give 6α,16α-dimethyl-9α-bromo-11β-chloro-17α-hydroxyprogesterone 17-acetate.

Alternatively, the compound of this example is prepared according to the following procedures B and C.

B. 6α,16α-DIMETHYL-9α-BROMO-11β-CHLORO-17α-HYDROXYPROGESTERONE

6α,16α-dimethyl - 17α - hydroxy-4,9(11)-pregnadiene-3,20-dione (the compound of Example 38) is reacted with lithium chloride, N-bromoacetamide and hydrogen chloride in the manner of Example 41A and the resultant product isolated and purified to give 6α,16α-dimethyl-9α-bromo-11β-chloro-17α-hydroxyprogesterone.

C. 6α,16α-DIMETHYL-9α-BROMO-11β-CHLORO-17α-HYDROXYPROGESTERONE 17-ACETATE

The 17α-hydroxyprogesterone of Example 41B is reacted with acetic acid and trifluoroacetic anhydride in the manner described in Example 2 to give 6α,16α-dimethyl-9α-bromo-11β-chloro - 17α - hydroxyprogesterone 17-acetate.

EXAMPLE 42

*6α,16α-dimethyl-9α,11β-dichloro-17α-hydroxysterone 17-caproate*

A. 6α,16α-DIMETHYL-17α-HYDROXY-4,9(11)-PREGNADIENE-3,20-DIONE 17-CAPROATE

In the manner described in Example 3, 6α,16α-dimethyl-17α-hydroxy - 4,9(11) - pregnadienec-3,20-dione (the compound of Example 38) is reacted with caproic acid and trifluoroacetic anhydride and the resultant product isolated and crystallized from ether pentane to give 6α,16α-dimethyl-17α-hydroxy-4,9(11) - pregnadiene - 3,20-dione 17-caproate.

B. 6α,16α-DIMETHYL-9α,11β-DICHLORO-17α-HYDROXYPROGESTERONE 17-CAPROATE

The 4,9(11)-pregnadiene of Example 42A is reacted with chlorine in carbon tetrachloride and in the presence of pyridine and the resultant product isolated and purified in the manner of Example 21 to give 6α,16α-dimethyl-9α,11β-dichloro-17α-hydroxyprogesterone 17-caproate.

EXAMPLE 43

*6α,16α-dimethyl-9α-chloro-11β-fluoro-17α-hydroxyprogesterone 17-caproate*

6α,16α-dimethyl-17α-hydroxy - 4,9(11)-pregnadiene-3,20-dione 17-caproate (the compound of Example 42A) is reacted with N-chlorosuccinimide and hydrogen fluoride in diethylacetic acid in the manner of Example 24. The resultant product is isolated and purified in the described manner to give 6α,16α-dimethyl-9α-chloro-11β-fluoro-17α-hydroxyprogesterone 17-caproate.

EXAMPLE 44

*6α-fluoro-16α-methyl-17α-hydroxy-4,9(11)-pregnadiene-3,20-dione*

A. 5α,11α,17α-TRIHYDROXY-6β-FLUORO-16α-METHYLPROGESTERONE

5α,6α-epoxy-11α,17α-dihydroxy - 16α-methylpregnane-3,20-dione 3,20-bisethylene ketal (the compound of Example 38C) is reacted with aqueous hydrofluoric acid and then with oxalic acid in methanol in the manner described in Example 31A. The resultant product is isolated in the described manner to a residue comprising 5α,11α,17α-trihydroxy-6β - fluoro - 16α - methylprogesterone. This product is used without further purification in the following procedure.

B. 6β-FLUORO-11α,17α-DIHYDROXY-16α-METHYLPROGESTERONE

The 5α-hydroxy-6β-fluoroprogesterone of Example 44A is reacted with aqueous acetic acid in the manner of Example 31B. The resultant product is isolated in the described manner and crystallized from ethyl acetate to give 6β-fluoro-11α,17α - dihydroxy-16α-methylprogesterone.

C. 6α-FLUORO-11α,17α-DIHYDROXY-16α-METHYLPROGESTERONE

In the manner described in Example 31C, 300 mg. of the 6β-fluoroprogesterone of Example 44B is reacted with anhydrous hydrogen chloride in chloroform. The resultant product is isolated in the described manner and crystallized from acetone-hexane to give 6α-fluoro-11α,17α-dihydroxy-16α-methylprogesterone.

Alternatively, the compound of this example is prepared by subjecting 6α-fluoro-16α-methyl-17α-hydroxyprogesterone (the compound of Example 17A) to the action of a culture of *Rizopus nigricans* in the manner of Example 20A.

D. 6α-FLUORO-11α,17α-DIHYDROXY-16α-METHYLPROGESTERONE 11-p-TOLUENESULFONATE

Five grams of the 11α-hydroxyprogesterone of Example 44C is reacted with p-toluenesulfonyl chloride in chloroform in the presence of pyridine in the manner of Example 31D. The resultant product is isolated in the described manner and crystallized from acetone-hexane to give 6α-fluoro-11α,17α-dihydroxy-16α-methylprogesterone 11-p-toluenesulfonate.

E. 6α-FLUORO-16α-METHYL-17αHYDROXY-4,9(11)-PREGNADIENE-3,20-DIONE

Five grams of the 11α-p-toluenesulfonate of the progesterone of Example 44D is reacted with sodium acetate in acetic acid and the resultant product isolated and purified in the manner described in Example 31E to give 6α-fluoro-16α-methyl-17α - hydroxy-4,9(11)-pregnadiene-3,20-dione.

EXAMPLE 45

*6α-fluoro-16α-methyl-17α - hydroxy-4,9(11)-pregnadiene 3,20-dione 17-acetate*

In the manner described in Example 2, the 6α-fluoro-17α-hydroxypregnadiene of Example 44 is esterified by means of acetic acid and trifluoroacetic anhydride and the resultant product isolated and purified to give 6α-fluoro-16α-methyl-17α - hydroxy - 4,9(11) - pregnadiene-3,20-dione 17-acetate.

In similar manner, by substituting other lower alkanoic acids such as propionic or valeric for acetic acid in the above procedure, the corresponding 17-lower alkanoates are obtained, i.e. the 17-propionate and 17-valerate respectively of 6α-fluoro-16α-methyl-17α-hydroxy-4,9(11)-pregnadiene-3,20-dione.

EXAMPLE 46

*6α-fluoro-9α,11β-dichloro-16α-methyl-17α-hydroxyprogesterone 17-acetate*

A. In the manner described in Example 21, 6α-fluoro-16α-methyl-17α-hydroxy - 4,9(11) - pregnadiene-3,20-dione 17-acetate (the compound of Example 45) is reacted with chlorine in carbon tetrachloride and in the presence of pyridine and the resultant product isolated and crystallized from ethyl acetate to give 6α-fluoro-9α,11β-dichloro-16α-methyl - 17α - hydroxyprogesterone 17-acetate.

Alternatively, the compound of this example is prepared according to the following procedures B and C.

B. 6α-FLUORO-9α,11β-DICHLORO-16α-METHYL-17α-HYDROXYPROGESTERONE

6α-fluoro-16α-methyl - 17α-hydroxy-4,9(11)-pregnadiene-3,20-dione (the compound of Example 44) is reacted with chlorine in carbon tetrachloride in the presence of pyridine in the manner of Example 21. The resultant product is isolated and purified in the described manner to give 6α-fluoro-9α,11β-dichloro - 16α-methyl-17α-hydroxyprogesterone.

C. 6α-FLUORO-9α,11β-DICHLORO-16α-METHYL-17α-HYDROXYPROGESTERONE 17-ACETATE

The 17α-hydroxyprogesterone of Example 46B is esterified by means of acetic acid and trifluoroacetic anhydride in the manner described in Example 2 to give 6α-fluoro-9α,11β-dichloro-16α-methyl-17α-hydroxyprogesterone 17-acetate.

EXAMPLE 47

*6β-fluoro-16α-methyl-17α-hydroxy-4,9(11)-pregnadiene-3,20-dione*

A. 6β-FLUORO-11α,17α-DIHYDROXY-16α-METHYLPROGESTERONE 11-p-TOLUENESULFONATE

6β-fluoro - 11α,17α-dihydroxy - 16α-methylprogesterone (the compound of Example 44B) is reacted with p-toluenesulfonyl chloride and the resultant product isolated and purified in the manner described in Example 20B to give 6β-fluoro-11α,17α-dihydroxy-16α-methylprogesterone 11-p-toluenesulfonate.

B. 6β-FLUORO-16α-METHYL-17α-HYDROXY-4,9(11)-PREGNADIENE-3,20-DIONE

To 1 g. of 6β-fluoro-11α,17α-dihydroxy-16α-methylprogesterone 11-p-toluenesulfonate (the compound of Example 47A) in 50 ml. of anhydrous methanol there is added 3 g. of finely divided calcium carbonate and the mixture is stirred and refluxed for 4 hours. The reaction mixture is cooled to room temperature and filtered. The filtrate is evaporated to a residue which is triturated with water. A solid separates which is filtered and crystallized from acetone-hexane to give 6β-fluoro-16α-methyl-17α-hydroxy-4,9(11)-pregnadiene-3,20-dione.

EXAMPLE 48

*6β-fluoro-16α-methyl-17α-hydroxy-4,9(11)-pregnadiene-3,20-dione 17-acetate*

The 6β-fluoro-17α-hydroxypregnadiene of Example 47 is esterified by means of acetic acid and trifluoroacetic anhydride in the manner described in Example 2 to give 6β-fluoro - 16α-methyl - 17α-hydroxy - 4,9(11)-pregnadiene-3,20-ione 17-acetate.

Similarly, by substituting other lower alkanoic acids such as butyric and valeric for acetic acid in the above procedure, the corresponding 17-lower alkanoates are obtained, i.e. the 17-butyrate and 17-valerate respectively of 6β-fluoro-16α-methyl-17α-hydroxy-4,9(11)-pregnadiene-3,20-dione.

EXAMPLE 49

*6β-fluoro-9α,11β-dichloro-16α-methyl-17α-hydroxyprogesterone 17-acetate*

A. 6β-fluoro-16α-methyl-17α-hydroxy-4,9(11)-pregnadiene-3,20-dione 17-acetate (the compound of Example 48) is reacted with chlorine in carbon tetrachloride and in the presence of pyridine in the manner of Example 21. The resultant product is isolated and purified in the described manner to give 6β-fluoro-9α,11β-dichloro-16α-methyl-17α-hydroxyprogesterone 17-acetate.

Alternatively, the compound of this example is prepared according to the following procedures B and C.

B. 6β-FLUORO-9α,11β-DICHLORO-16α-METHYL-17α-HYDROXYPROGESTERONE

6β-fluoro-16α-methyl-17α-hydroxy-4,9(11)-pregnadiene-3,20-dione (the compound of Example 47) is reacted with chlorine in carbon tetrachloride and in the presence of pyridine in the manner described in Example 21 and the resultant product isolated and purified to give 6β-fluoro-9α,11β-dichloro-16α-methyl-17α-hydroxyprogesterone.

C. 6β-FLUORO-9α,11β-DICHLORO-16α-METHYL-17α-HYDROXYPROGESTERONE 17-ACETATE

The 17α-hydroxyprogesterone of Example 49B is esterified with acetic acid and trifluoroacetic anhydride in the manner described in Example 2 to give 6β-fluoro-9α,11β-dichloro-16α-methyl-17α-hydroxyprogesterone 17-acetate.

EXAMPLE 50

*6α,21-difluoro-16α-methyl-17α-hydroxy-4,9(11)-pregnadiene-3,20-dione 17-acetate*

A. 6α-FLUORO-21-IODO-16α-METHYL-17α-HYDROXY-4,9(11)-PREGNADIENE-3,20-DIONE

6α - fluoro - 16α - methyl - 17α - hydroxy - 4,9(11)-pregnadiene-3,20-dione (the compound of Example 44) is reacted with iodine and finely powdered calcium oxide in the manner of Example 8. The resultant product is isolated in the described manner and crystallized from acetone-hexane to give 6α-fluoro-21-iodo-16α-methyl-17α-hydroxy-4,9(11)-pregnadiene-3,20-dione.

B. 6α,21-DIFLUORO-16α-METHYL-17α-HYDROXY-4,9(11)-PREGNADIENE-3,20-DIONE

The 21-iodopregnadiene of Example 50A is reacted with silver fluoride in moist acetonitrile in the manner of Example 10. The resultant product is isolated in the described manner and crystallized from acetonehexane to give 6α,21-difluoro-16α-methyl-17α-hydroxy-4,9(11)-pregnadiene-3,20-dione.

C. 6α,21-DIFLUORO-16α-METHYL-17α-HYDROXY-4,9(11)-PREGNADIENE-3,20-DIONE 17-ACETATE

The 17α-hydroxypregnadiene of Example 50B is esterified by means of acetic acid and trifluoroacetic anhydride in the manner described in Example 2 to give 6α,21-difluoro - 16α - methyl - 17α - hydroxy - 4,9(11) - pregnadiene-3,20-dione 17-acetate.

In similar manner, by substituting other lower alkanoic acids such as propionic and caproic for acetic acid in the above procedure, the corresponding 17-lower alkanoates are obtained, i.e. the 17-propionate and 17-caproate respectively of 6α,21 - difluoro - 16α - methyl - 17α - hydroxy-4,9(11)-pregnadiene-3,20-dione.

EXAMPLE 51

*6α,11β,21-trifluoro-9α-chloro-16α-methyl-17α-hydroxyprogesterone 17-acetate*

A. 270 mg. of 6α,21-difluoro-16α-methyl-17α-hydroxy-4,9(11)-pregnadiene-3,20-dione 17-acetate (the compound of Example 50) dissolved in 20 ml. of diethylacetic acid is reacted with 135 mg. of N-chlorosuccinimide and 320 mg. of hydrogen fluoride in tetrahydrofuran in the manner of Example 24. The resultant product is isolated in the described manner and crystallized from ethyl acetatehexane to give 6α,11β-21-trifluoro-9α-chloro-16α-methyl-17α-hydroxyprogesterone 17-acetate.

Alternatively, the compound of this example is prepared according to the following procedures B and C.

B. 6α,11β,21-TRIFLUORO-9α-CHLORO-16α-METHYL-17α-HYDROXYPROGESTERONE

6α,21 - difluoro - 16α - methyl - 17α - hydroxy - 4,9(11)-pregnadiene-3,20-dione (the compound of Example 50B) is reacted with N-chlorosuccinimide and hydrogen fluoride in the manner described in Example 24 and the resultant product isolated and purified to give 6α,11β,21-trifluoro-9α-chloro-16α-methyl-17α-hydroxyprogesterone.

C. 6α,11β,21-TRIFLUORO-9α-CHLORO-16α-METHYL-17α-HYDROXYPROGESTERONE 17-ACETATE

The 17α-hydroxyprogesterone of Example 51B is esterified by means of acetic acid and trifluoroacetic anhydride in the manner described in Example 2 to give 6α,11β,21-trifluoro - 9α - chloro - 16α - methyl - 17α - hydroxyprogesterone 17-acetate.

EXAMPLE 52

*6α,21-difluoro-9α,11β-dichloro-16α-methyl-17α-hydroxyprogesterone 17-acetate*

A. 6α,21 - difluoro - 16α-methyl-17α-hydroxy-4,9(11)-pregnadiene-3,20-dione 17-acetate (the compound of Example 50) is reacted with chlorine in carbon tetrachloride and in the presence of pyridine in the manner of Example 21, and the resultant product isolated and purified to give 6α,21-difluoro-9α,11β-dichloro-16α-methyl-17α-hydroxyprogesterone 17-acetate.

Alternatively, the compound of this example is prepared according to the following procedures B and C.

B. 6α,21-DIFLUORO-9α,11β-DICHLORO-16α-METHYL-17α-HYDROXYPROGESTERONE

6α,21 - difluoro-16α-methyl-17α-hydroxy-4,9(11)-pregnadiene-3,20-dione (the compound of Example 50B) is reacted with chlorine in carbon tetrachloride and in the presence of pyridine in the manner of Example 21 and the resultant product isolated and purified to give 6α,21- difluoro - 9α11β - dichloro-16α-methyl-17α-hydroxyprogesterone.

C. 6α,21-DIFLUORO-9α,11β-DICHLORO-16α-METHYL-17α-HYDROXYPROGESTERONE 17-ACETATE

The 17α-hydroxyprogesterone of Example 52B is esterified with acetic acid and trifluoroacetic anhydride in the manner described in Example 2 to give 6α,21-difluoro-9α,11β - dichloro-16α-methyl-17α-hydroxyprogesterone 17-acetate.

EXAMPLE 53

*16α-methyl-17α-hydroxy-4,9(11)-pregnadiene-3,20-dione 17-acetate*

A. 11α,17α-DIHYDROXY-16α-METHYLPROGESTERONE 11-p-TOLUENESULFONATE

11α,17α-dihydroxy-16α-methylprogesterone (the compound of Example 38A) is reacted with p-toluenesulfonyl chloride in the presence of pyridine in the manner of Example 20B. The resultant product is isolated in the described manner and crystallized from acetone-hexane to give 11α,17α-dihydroxy16α-methylprogesterone 11-p-toluenesulfonate.

B. 16α-METHYL-17α-HYDROXY-4,9(11)-PREGNADIENE-3,20-DIONE

Five grams of the 11α-p-toluenesulfonate of the progesterone of Example 53A is reacted with 7.5 g. of sodium acetate in acetic acid in the manner of Example 20C. The resultant product is isolated in the described manner and crystallized from ether-hexane to give 16α-methyl-17α-hydroxy-4,9(11)-pregnadiene-3,20-dione.

C. 16α-METHYL-17α-HYDROXY-4,9(11)-PREGNADIENE-3,20-DIONE 17-ACETATE

The 17α-hydroxypregnadiene of Example 53B is reacted with acetic acid and trifluoroacetic anhydride in the manner of Example 2 and the resultant product isolated and purified to give 16α-methyl-17α-hydroxy-4,9(11)-pregnadiene-3,20-dione 17-acetate.

Similarly, by substituting other lower alkanoic acids such as propionic and caproic for acetic acid in the above procedure, the corresponding 17-lower alkanoates are obtained, i.e. the 17-propionate and 17-caproate of 16α-methyl-17α-hydroxy-4,9(11)-pregnadiene-3,20-dione.

EXAMPLE 54

*9α,11β-dichloro-16α-methyl-17α-hydroxyprogesterone 17-acetate*

A. In the manner described in Example 21, 1 g. of 16α - methyl - 17α - hydroxy-4,9(11)-pregnadiene-3,20-dione 17-acetate (the compound of Example 53) is reacted with 0.24 g. of chlorine in carbon tetrachloride in the presence of pyridine and the resultant product isolated and purified to give 9α,11β-dichloro-16α-methyl-17α-hydroxprogesterone 17-acetate.

Alternatively, the compound of this example is prepared according to the following procedures B and C.

B. 9α,11β-DICHLORO-16αMETHYL-17α-HYDROXYPROGESTERONE

16α - methyl - 17α-hydroxy-4,9(11)-pregnadiene-3,20-dione (the compound of Example 53B) is chlorinated in the manner described in Example 54A and the resultant product isolated and purified to give 9α,11β-dichloro-16α-methyl-17α-hydroxyprogesterone.

C. 9α,11β-DICHLORO-16α-METHYL-17α-HYDROXYPROGESTERONE 17-ACETATE

The 17α-hydroxyprogesterone of Example 54B is reacted with acetic acid and trifluoroacetic anhydride and the resultant product isolated and purified in the manner described in Example 2 to give 9α,11β-dichloro-16α-methyl-17α-hydroxyprogesterone 17-acetate.

EXAMPLE 55

*9α-chloro-11β-fluoro-16α-methyl-17α-hydroxyprogesterone 17-acetate*

A. A solution of 225 mg. of 16α-methyl-17α-hydroxy-4,9(11)-pregnadiene-3,20-dione 17-acetate (the compound of Example 53) in 20 ml. of diethylacetic acid is reacted with 135 mg. of N-chlorosuccinimide and 320 mg. of hydrogen fluoride in the manner of Example 24. The resultant product is isolated in described manner and crystallized from methanol to give 9α-chloro-11β-fluoro-16α-methyl-17α-hydroxyprogesterone 17-acetate.

Alternatively, the compound of this example is prepared according to the following procedures B and C.

B. 9α-CHLORO-11β-FLUORO-16α-METHYL-17α-HYDROXYPROGESTERONE

16α - methyl - 17α-hydroxy-4,9(11)-pregnadiene-3,20-dione (the compound of Example 53B) is reacted with N-chlorosuccinimide and hydrogen fluoride in the manner described in Example 55A to give 9α-chloro-11β-fluoro-16α-methyl-17α-hydroxyprogesterone.

B. 9α,11β-DICHLORO-16α-METHYL-17α-HYDROXYPROGESTERONE 17-ACETATE

The 17α-hydroxyprogesterone of Example 55B is esterified by means of acetic acid and trifluoroacetic anhydride in the manner described in Example 2 to give 9α-chloro-11β - fluoro - 16α-methyl-17α-hydroxyprogesterone 17-acetate.

EXAMPLE 56

*3β-hydroxy-16α-ethyl-5-pregnene-20-one-3-acetate*

A. 3β-HYDROXY-16α-ETHYL-5-PREGNENE-20-ONE

A solution of 3.68 g. of 3β-hydroxy-5,16-pregnadiene-20-one in 22 ml. of dry toluene is added to methylmagnesium iodide prepared from 7 g. of methyl iodide and 1.2 g. of magnesium in 40 ml. of ether, and containing 200 mg. of cupric chloride. The reaction mixture is distilled until a vapor temperature of 100° C. is reached. The distillation is discontinued and the reaction mixture is maintained at 100° C. for 6 hours. The reaction mixture is cooled, poured onto ice and an adqueous solution of ammonium chloride. The organic layers are separated and washed with water, dried over magnesium sulfate, filtered, and evaporated to a residue which is chromatographed on Florisil. 15–30% ether-in-hexane eluates are combined and evaporated to a residue which is crystallized from acetone-hexane to give 3β-hydroxy-16α-ethyl-5-pregnene-20-one.

B. 3β-HYDROXY-16α-ETHYL-5-PREGNENE-20-ONE 3-ACETATE 0.1 gram of 3β-hydroxy-16α-ethyl-5-pregnene-20-one (the compound of Example 56A) is dissolved in 1 ml. of dry pyridine and there is added 0.2 ml. of acetic anhydride. The reaction solution is left at room temperature for 4 hours and then is diluted with water. A solid separates which is filtered, washed with water and crystallized from aqueous methanol to give 3β-hydroxy-16α-ethyl-5-pregnene-20-one 3-acetate.

EXAMPLE 57

*3β-hydroxy-16α-n-butyl-5-pregnene-20-one 3-acetate*

A. 3β-HYDROXY-16α-n-BUTYL-5-PREGNENE-20-ONE

3β-hydroxy-5,16-pregnadiene-20-one is reacted with n-butyl magnesium iodide (prepared from n-butyl iodide and magnesium in ether) in the manner of Example 56A. The resultant product is isolated in the described manner and crystallized from acetone-hexane to give 3β-hydroxy-16α-n-butyl-5-pregnene-20-one.

B. 3β-HYDROXY-16α-n-BUTYL-5-PREGNENE-20-ONE 3-ACETATE

In the manner described in Example 56B, the 3β-hydroxypregnene of Example 57A is reacted with acetic anhydride in pyridine and the resultant product isolated and crystallized from aqueous methanol to give 3β-hydroxy-16α-n-butyl-5-pregnene-20-one 3-acetate.

EXAMPLE 58

*16α-ethylprogesterone*

One gram of 3β-hydroxy-16α-ethyl-5-pregnene-20-one (the compound of Example 56A) is dissolved in 80 ml. of toluene and 15 ml. of cyclohexanone. Approximately 11 ml. of solvent is distilled and then, over a period of 25 minutes, a solution of 0.56 g. of aluminum isopropylate in 10 ml. toluene is added while an additional 7 ml. of solvent is being distilled from the reaction solution. The reaction mixture is refluxed under nitrogen 90 minutes further, then cooled and water added. The organic phase is separated, washed with dilute hydrochloric acid and then water, dried over magnesium sulfate, filtered and evaporated in vacuo to a residue which is chromatographed over Florisil. The hexane and ether in hexane (0:100 through 30:70) eluates are combined and evaporated to a residue which is crystallized from isopropyl ether to give 16α-ethylprogesterone.

EXAMPLE 59

*16α-n-butylprogesterone*

3β-hydroxy-16α-n-butyl-5-pregnene-20-one (the compound of example 57A) is reacted with aluminum isopropylate in the manner of Example 58. The resultant product is isolated in the described manner and crystallized from isopropyl ether to give 16α-n-butylprogesterone.

EXAMPLE 60

*16β-n-butylprogesterone*

A. 3β-HYDROXY-5,6,17α-TRIBROMO-16α-n-BUTYL-PREGNANE-20-ONE

Ten grams of 3β-hydroxy-16α-n-butyl-5-pregnene-20-one (the compound of Example 57A) is dissolved in 150 ml. of acetic acid. A solution of 4.4 g. of bromine in 10 ml. of acetic acid is added and the reaction solution stirred vigorously at room temperature for 5 minutes. While continuously stirring the reaction solution, 5 g. of bromine in 10 ml. of acetic acid are then added dropwise over a period of 10 minutes. The reaction solution is then diluted with water. The precipitate which results is filtered and washed with water to yield a product comprising 3β - hydroxy - 5,6,17α-tribromo-16α-n-butylpregnane-20-one. This product is used immediately without further purification in the reaction described in the following procedure.

B. 3β-HYDROXY-16α-n-BUTYL-17α-BROMO-5-PREGNENE-20-ONE

The 5,6,17α-tribromopregnane prepared in Example 60A is dissolved in 400 ml. of methanol and there is added 4.5 g. of sodium iodide. The reaction mixture is stirred at 30° C. for 90 minutes. Four liters of water are added and precipitate forms which is filtered and crystallized from acetone-hexane to give 3β-hydroxy-16α-n-butyl-17α-bromo-5-pregnene-20-one.

C. 3β-HYDROXY-16-n-BUTYL-5,16-PREGNADIENE-20-ONE

To one gram of the 17α-bromopregnene of Example 60B is added 12 ml. of dimethylformamide and the reaction mixture is refluxed for 3 hours. The solution is poured into dilute hydrochloric acid and extracted with methylene chloride. The organic extracts are combined, washed with water, dried over magnesium sulfate, filtered and evaporated to a residue which is crystallized from ethyl acetate-hexane to give 3β-hydroxy-16-n-butyl-5,16-pregnadiene-20-one.

D. 3β-HYDROXY-16β-n-BUTYL-5-PREGNENE-20-ONE 500 mg. of Raney nickel are prepared in the manner of Mozingo (Organic Synthesis 21, 15 (1941), John Wiley & Sons, New York, New York).

One gram of the 16-n-butylpregnadiene of Example 60C is dissolved in 65 ml. of ethyl acetate to which is added 500 mg. of Raney nickel prepared as described above and reduced with hydrogen until 1 mole uptake of hydrogen is observed. The reduction is stopped at this point and the Raney nickel filtered from the reaction solution. The solution is evaporated to a residue which is chromatographed on Florisil. With 15–30% ether in hexane, the eluates are combined and evaporated to a residue which is crystallized from ether-hexane to give 3β-hydroxy-16β-n-butyl-5-pregnene-20-one.

E. 16β-n-BUTYLPROGESTERONE

In the manner described in Example 58, the 3β-hydroxy-5-pregnene of Example 60D is reacted with aluminum isopropylate and the resultant product isolated and crystallized from isopropyl ether to give 16β-n-butylprogesterone.

EXAMPLE 61

*3β-hydroxy-16β-n-butyl-5-pregnene-20-one 3-acetate*

The 3β-hydroxypregnene of Example 60D is reacted with acetic anhydride in pyridine in the manner described in Example 56B to give 3β-hydroxy-16β-n-butyl-5-pregnene-20-one 3-acetate.

EXAMPLE 62

*16β-ethylprogesterone*

A. 3β-HYDROXY-5,6,17α-TRIBROMO-16α-ETHYL-PREGNANE-20-ONE

3β-hydroxy-16α-ethyl-5-pregnene-20-one (prepared as in Example 56A) is brominated in the manner of Example 60A and the resultant product isolated to give 3β-hydroxy - 5,6,17α - tribromo - 16α - ethylpregnane-20-one which is used immediately without further purification in the following procedure.

B. 3β-HYDROXY-16α-ETHYL-17α-BROMO-5-PREGNENE-20-ONE

The 5,6,17α-tribromopregnane of Example 62A is reacted with sodium iodide in methanol and the resultant product isolated and purified in the manner described in Example 60B to give 3β-hydroxy-16α-ethyl-17α-bromo-5-pregnene-20-one.

C. 3β-HYDROXY-16-ETHYL-5,16-PREGNADIENE-20-ONE

The 17α-bromo-5-pregnene of Example 62B is reacted with dimethylformamide and the resultant product isolated and purified in the manner described in Example 60C to give 3β-hydroxy-16-ethyl-5,16-pregnadiene-20-one.

D. 3β-HYDROXY-16β-ETHYL-5-PREGNENE-20-ONE

The 16-ethyl-5,16-pregnadiene of Example 62C is selectively reduced with hydrogen in the presence of Raney nickel in the manner described in Example 60D to give 3β-hydroxy-16β-ethyl-5-pregnene-20-one.

E. 16β-ETHYLPROGESTERONE

The 16β-ethyl-5-pregnene of Example 62D is reacted with aluminum isopropylate in the manner described in Example 60E and the resultant product isolated and purified to give 16β-ethylprogesterone.

EXAMPLE 63

*3β-hydroxy-16β-ethyl-5-pregnene-20-one 3-acetate*

The 3β-hydroxypregnene of Example 62D is esterified by means of acetic anhydride in anhydrous pyridine in the manner described in Example 56B to give 3β-hydroxy-16β-ethyl-5-pregnene-20-one 3-acetate.

EXAMPLE 64

*16α-ethyl-4,9(11)-pregnadiene-3,20-dione*

A. 11α-HYDROXY-16α-ETHYLPROGESTERONE

16α-ethylprogesterone (the compound of Example 58) is subjected to the action of a culture of *Rhizopus nigricans* and the resultant product isolated and purified in the manner described in Example 20A to give 11α-hydroxy-16α-ethylprogesterone.

B. 11α-HYDROXY-16α-ETHYLPROGESTERONE 11-p-TOLUENESULFONATE

The 11α-hydroxy-16α-ethylprogesterone prepared in Example 64A is reacted with p-toluenesulfonyl chloride in chloroform and dry pyridine and the resultant product isolated and purified in the manner of Example 20B to give 11α-hydroxy-16α-ethylprogesterone 11-p-toluensulfonate.

C. 16α-ETHYL-4,9(11)-PREGNADIENE-3,20-DIONE

11α-hydroxy-16α-ethylprogesterone 11-p-tolenesulfonate (the compound of Example 64B) is reacted with anhydrous sodium acetate in acetic acid and the resultant product isolated and purified in the manner described in Example 20C to give 16α-ethyl-4,9(11)-pregnadiene-3,20-dione.

EXAMPLE 65

*16β-ethyl-4,9(11)-pregnadiene-3,20-dione*

A. 11α-HYDROXY-16β-ETHYLPROGESTERONE

16β-ethylprogesterone (the compound of Example 62) is subjected to the action of a culture of *Rhizopus nigricans* and the resultant product isolated and purified in the manner of Example 20A to give 11α-hydroxy-16β-ethylprogesterone.

B. 11α-HYDROXY-16β-ETHYLPROGESTERONE 11-p-TOLUENESULFONATE

The 11α-hydroxyprogesterone of Example 65A is reacted with p-toluenesulfonyl chloride in chloroform and pyridine and the resultant product isolated and purified in the manner described in Example 20B to give 11α-hydroxy-16β-ethylprogesterone 11-p-toluenesulfonate.

C. 16β-ETHYL-4,9(11)-PREGNADIENE-3,20-DIONE

11α-hydroxy-16α-ethylprogesterone 11-p-toluenesulfonate (the compound of Example 65B) is reacted with sodium acetate in acetic acid and the resultant product isolated and purified in the manner described in Example 20C to give 16β-ethyl-4,9(11)-pregnadiene-3,20-dione.

EXAMPLE 66

*16α-n-butyl-4,9(11)-pregnadiene-3,20-dione*

A. 11α-HYDROXY-16α-n-BUTYLPROGESTERONE

16α-n-butylprogesterone (the compound of Example 59) is subjected to the action of a culture of *Rhizopus nigricans* and the resultant product isolated and purified in the manner of Example 20A to give 11α-hydroxy-16α-n-butylprogesterone.

B. 11α-HYDROXY-16α-n-BUTYLPROGESTERONE 11-p-TOLUENESULFONATE

The 11α-hydroxyprogesterone of Example 66A is reacted with p-toluenesulfonyl chloride in chloroform and pyridine and the resultant product isolated and purified in the manner described in Example 20B to give 11α-hydroxy-16α-n-butylprogesterone 11-p-toluenesulfonate.

C. 16α-n-BUTYL-4,9(11)-PREGNADIENE-3,20-DIONE

11α-hydroxy-16α-n-butylprogesterone 11-p-toluenesulfonate (the compound of Example 66B) is reacted with sodium acetate in acetic acid and the resultant product isolated and purified in the manner of Example 20C to give 16α-n-butyl-4,9(11)-pregnadiene-3,20-dione.

EXAMPLE 67

*16β-n-butyl-3,9(11)-pregnadiene-3,20-dione*

A. 11α-HYDROXY-16β-n-BUTYUPROGESTERONE

16β-n-butylprogesterone (the compound of Example 60) is subjected to the action of a culture of *Rhizopus nigricans* and the resultant product isolated and purified in the manner described in Example 20A to give 11α-hydroxy-16β-n-butylprogesterone.

B. 11α-HYDROXY-16β-n-BUTYLPROGESTERONE 11-p-TOLUENESULFONATE

The 11α-hydroxyprogesterone of Example 67A is esterified by means of p-toluenesulfonyl chloride in chloroform and pyridine and the resultant product isolated and purified in the manner described in Example 20B to give 11α-hydroxy-16β-n-butylprogesterone 11-p-toluenesulfonate.

C. 16β-n-BUTYL-4,9(11)-PREGNADIENE-3,20-DIONE

11α-hydroxy-16β-n-butylprogesterone 11-p-toluenesulfonate (the compound of Example 67B) is reacted with sodium acetate in acetic acid and the resultant product isolated and purified in the manner described in Example 20C to give 16β-n-butyl-4,9(11)-pregnadiene-3,20-dione.

EXAMPLE 68

*9α,11β-dichloro-16α-ethylprogesterone*

16α-ethyl-4,9(11)-pregnadiene-3,20-dione (the compound of Example 64) is reacted with chlorine in carbon tetrachloride and in the presence of pyridine and the resultant product isolated and purified in the manner described in Example 21 to give 9α,11β-dichloro-16α-ethylprogesterone.

In a similar manner, 16β-n-butyl-4,9(11)-pregnadiene-3,20-dione is chlorinated to give 9α,11β-dischloro-16β-ethylprogesterone.

EXAMPLE 69

*9α-chloro-11β-fluoro-16β-ethylprogesterone*

16β-ethyl-4,9(11)-pregnadiene-3,20-dione (the compound of Example 65) is reacted with N-chlorosuccinimide and hydrogene fluoride in diethylacetic acid and the resultant product isolated and purified in the manner described in Example 24 to given 9α-chloro-11β-fluoro-16β-ethylprogesterone.

EXAMPLE 70

*9α,11β-dichloro-16β-n-butylprogesterone*

16β-n-butyl-4,9(11)-pregnadiene-3,20-dione (the compound of Example 67) is reacted with chlorine in carbon tetrachloride and in the presence of pyridine and the resultant product isolated and purified in the manner of Example 21 to give 9α,11β-dichloro-16β-n-butylprogesterone.

In similar manner, 16α-n-butyl-4,9(11)-pregnadine is chlorinated to give 9α,11β-dichloro-16α-n-butylprogesterone.

EXAMPLE 71

*9α-chloro-11β-fluoro-16α-n-butylprogresterone*

16α-n-butyl-4,9(11)-pregnadiene-3,20-dione (the compound of Example 66) is reacted with N-chlorosuccinimide and hydrogen fluoride in diethylacetic acid and the resultant product isolated and purified in the manner described in Example 24 to give 9α-chloro-11β-fluoro-16α-n-butylprogresterone.

EXAMPLE 72

*16β-methyl-17α-hydroxyprogesterone*

A. 3β-HYDROXY-5,6-DICHLORO-16β-METHYLPREGNANE-20-ONE 3-ACETATE

In the manner described in Example 1A, a solution of 3β-hydroxy-16β-methyl-5-pregnene-20-one 3-acetate in carbon tetrachloride and in the presence of pyridine is reacted with chlorine and the resultant product isolated and purified to give 3β-hydroxy-5,6-dichloro-16β-methylpregnane-30-one 3-acetate.

B. 3β,17α-DIHYDROXY-5,6-DICHLORO-16β-METHYLPREGNANE-20-ONE

The 5,6-dichloro-16β-methylpregnane of Example 72A is reacted with acetic anhydride and p-toluenesulfonic acid in the manner described in Example 1B and the resultant product treated with peracetic acid and sodium acetate followed by alkaline hydrolysis in the manner described to give 3β,17α-dihydroxy-5,6-dichloro-16β-methylpregnane-20-one.

C. 5,6-DICHLORO-16β-METHYL-17α-HYDROXYPREGNANE-3,20-DIONE

The 3β,17α-dihydroxy-5,6-dichloro-16β-methylpregnane of Example 72B is reacted with chromium trioxide in acetic acid and the resultant product isolated and purified in the manner described in Example 1C to give 5,6-dichloro-16β-methyl-17α-hydroxypregnane-3,20-dione.

D. 16β-METHYL-17α-HYDROXY-5-PREGNENE-3,20-DIONE

The 5,6-dichloro-16β-methylpregnane of Example 72C is reacted with zinc in aqueous ethanol and the resultant product isolated and purified in the manner described in Example ID to give 16β-methyl-17α-hydroxy-5-pregnene-3,20-dione.

E. 16β-METHYL-17α-HYDROXYPROGESTERONE

The 16β-methyl-5-pregnene of Example 72D is reacted with an aqueous solution of sodium hydroxide and the resultant product isolated and purified in the manner described in Example IE to give 16β-methyl-17α-hydroxyprogesterone.

EXAMPLE 73

*16β-methyl-17α-hydroxyprogesterone 17-acetate*

In the manner described in Example 2, 16β-methyl-17α-hydroxyprogesterone (the compound of Example 72) is reacted with acetic acid and trifluoroacetic anhydride and the resultant product isolated and purified to give 16β-methyl-17α-hydroxyprogesterone 17-acetate.

EXAMPLE 74

*6β,16β-dimethyl-17α-hydroxyprogesterone 17-acetate*

A. 16β-METHYL-17α-HYDROXY-5-PREGNENE-3,20-DIONE 3,20-BISETHYLENE KETAL

In a manner similar to that described in Example 4A, 16β-methyl-17α-hydroxyprogesterone (the compound of Example 72) is reacted with ethylene glycol in the presence of p-toluenesulfonic acid and the resultant product isolated and purified to give 16β-methyl-17α-hydroxy-5-pregnene-3,20-dione 3,20-bisethylene ketal.

B. 5α,6α-EPOXY-16β-METHYL-17α-HYDROXYPREGNANE-3,20-DIONE 3,20-BISETHYLENE KETAL

The 3,20-bisethylene ketal of Example 74A is reacted with monoperphthalic acid in chloroform and in the presence of pyridine in a manner similar to that of Example 4B. The resultant product is isolated and purified in the described manner to give 5α,6α-epoxy-16β-methyl-17α-hydroxypregnane-3,20-dione 3,20-bisethylene ketal.

C. 5α,17α-DIHYDROXY-6β-DIMETHYLPREGNANE-3,20-DIONE

The 5α,6α-epoxypregnane of Example 74B is reacted with methyl magnesium iodide in ether and the resultant product hydrolyzed by means of oxalic acid in methanol in the manner described in Example 26C. The resultant product is isolated and purified in the described manner to give 5α,17α - dihydroxy - 6β,16β-dimethylpregnane-3,20-dione. This product is used immediately without further purification in the following procedure.

D. 6β,16β-DIMETHYL-17α-HYDROXYPROGESTERONE

The 5α-hydroxy-6β-methylpregnane of Example 74C is reacted with aqueous acetic acid and the resultant product isolated and purified in the manner described in Example 26D to give 6β,16β-dimethyl-17α-hydroxyprogesterone.

E. 6β,16β-DIMETHYL-17αHYDROXYPROGESTERONE 17-ACETATE

In a manner similar to that described in Example 2, the 17α-hydroxyprogesterone of Example 74D is reacted with acetic acid and trifluoroacetic anhydride to give 6β,16β-dimethyl-17α-hydoxyprogesterone 17-acetate.

EXAMPLE 75

*6α,16β-dimethyl-17α-hydroxyprogesterone 17-acetate*

A. 6α,16β-DIMETHYL-17α-HYDROXYPROGESTERONE

6β,16β-dimethyl-17α-hydroxyprogesterone (the compound of Example 74D) is reacted with anhydrous hydrogen chloride in chloroform and the resultant product isolated and purified in the manner described in Example 5 to give 6α,16β-dimethyl-17α-hydroxyprogesterone.

B. 6α,16β-DIMETHYL-17α-HYDROXYPROGESTERONE 17-ACETATE

In the manner described in Example 2, the 17α-hydroxyprogesterone of Example 75A is reacted with acetic acid and trifluoroacetic anhydride to give 6α,16β-dimethyl-17α-hydroxyprogesterone 17-acetate.

EXAMPLE 76

*6α,16β-dimethyl-17α-hydroxy-21-iodoprogesterone 17-acetate*

A. 6α,16β-DIMETHYL-17α-HYDROXY-21-IODOPROGESTERONE

6α,16β-dimethyl-17α-hydroxyprogesterone (the compound of Examplee 75A) is reacted with iodine and calcium oxide in the manner described in Example 8 and the resultant product isolated and purified to give 6α,16β-dimethyl-17α-hydroxy-21-iodoprogesterone.

B. 6α,16β-DIMETHYL-17α-HYDROXY-21-IODOPROGESTERONE 17-ACETATE

In a manner similar to that in Example 2, the 17α-hydroxyprogesterone of Example 76A is reacted with acetic acid and trifluoroacetic anhydride to give 6α,16β-dimethyl-17α-hydroxy-21-iodoprogesterone 17-acetate.

EXAMPLE 77

*6α,16β-dimethyl-17α-hydroxy-21-fluoroprogesterone 17-acetate*

A. 6α,16β-DIMETHYL-17α-HYDROXY-21-FLUOROPROGESTERONE

6α,16β-dimethyl-17α-hydroxy-21-iodoprogesterone (the compound of Example 76A) is reacted with silver flouride in moist acetonitrile and the resultant product isolated and purified in the manner described in Example 10 to give 6α,16β-dimethyl-17α-hydroxy-21-fluoroprogesterone.

B. 6α,16β-DIMETHYL-17α-HYDROXY-21-FLUOROPROGESTERONE 17-ACETATE

The 17α-hydroxyprogesterone of Example 77A is reacted with acetic acid and trifluoroacetic anhydride in the manner of Example 2 to give 6α,16β-dimethyl-17α-hydroxy-21-fluoroprogesterone 17-acetate.

EXAMPLE 78

*6β,16β-dimethylprogesterone*

A. 16β-METHYL-5-PREGNENE-3,20-DIONE 3,20-BISETHYLENE KETAL

16β-methylprogesterone is reacted with ethylene glycol in the presence of p-toluenesulfonic acid in the manner described in Example 12A and the resultant product isolated and purified to give 16β-methyl-5-pregnene-3,20-dione, 3,20-bisethylene ketal.

B. 5α,6α-EPOXY-16β-METHYLPREGNANE-3,20-DIONE 3,20-BISETHYLENE KETAL

The 5-pregnene of Example 78A is reacted with monoperphthalic acid in chloroform and in the presence of pyridine in the manner of Example 4B and, the resultant product isolated and purified to give 5α,6α-epoxy-16β-methylpregnane-3,20-dione 3,20-bisethylene ketal.

C. 5α-HYDROXY-6β,16β-DIMETHYLPREGNANE-3,20-DIONE

The 5α,6α-epoxypregnane of Example 78B is reacted with methyl magnesium iodide in ether and the resultant product reacted with oxalic acid in methanol in the manner of Example 26C. The final product is isolated and purified in the described manner to give 5α-hydroxy-6β,16β-dimethylpregnane-3,20-dione.

D. 6β,16β-DIMETHYLPROGESTERONE

The 5α-hydroxy-6β-methylpregnane of Example 78C is reacted with aqueous acetic acid and the resultant product isolated and purified in the manner described in Example 26D to give 6β,16β-dimethylprogesterone.

EXAMPLE 79

6α,16β-dimethylprogesterone

6β,16β-dimethylprogesterone (the compound of Example 78) is reacted with anhydrous hydrogen chloride in chloroform and the resultant product isolated and purified in the manner of Example 5 to give 6α,16β-dimethylprogesterone.

EXAMPLE 80

16β-methyl-21-fluoroprogesterone

A. 16β-METHYL-21-IODOPROGESTERONE

16β-methylprogesterone is reacted with iodine and calcium oxide and the resultant product isolated and purified in the manner described in Example 8 to give 16β-methyl-21-iodoprogesterone.

B. 16β-METHYL-21-FLUOROPROGESTERONE

16β-methyl-21-iodoprogesterone (the compound of Example 80A) is reacted with silver fluoride in moist acetonitrile and the resultant product isolated and purified in the manner described in Example 10 to give 16β-methyl-21-fluoroprogesterone.

EXAMPLE 81

6β-fluoro-16β-methyl-17α-hydroxyprogesterone 17-acetate

A. 5α,17α-DIHYDROXY-6β-FLUORO-16β-METHYLPREGNANE-3,20-DIONE

5α,6α-epoxy-16β-methyl-17α-hydroxypregnane-3,20-dione, 3,20-bis-ethylene ketal (the compound of Example 74B) is reacted with aqueous hydrofluoric acid and the resultant product reacted with oxalic acid in methanol in the manner described in Example 31A. The final product is isolated and purified in the described manner to give 5α,17α-dihydroxy-6β-fluoro-16β-methylpregnane-3,20-dione. This product is used without further purification in the following procedure.

B. 6β-FLUORO-16β-METHYL-17α-HYDROXYPROGESTERONE

The 5α-hydroxy-6β-fluoropregnane of Example 81A is reacted with aqueous acetic acid and the resultant product isolated and purified in the manner of Example 31B to give 6β-fluoro-16β-methyl-17α-hydroxyprogesterone.

C. 6β-FUUORO-16β-METHYL-17α-HYDROXYPROGESTERONE 17-ACETATE

The 17α-hydroxyprogesterone of Example 81B is reacted with acetic acid and trifluoroacetic anhydride and the resultant product isolated and purified in the manner of Example 2 to give 6β-fluoro-16α-methyl-17α-hydroxyprogesterone 17-acetate.

EXAMPLE 82

6α-fluoro-16β-methyl-17α-hydroxyprogesterone 17-acetate

A. 6αFLUORO-16β-METHYL-17α-HYDROXYPROGESTERONE

6β-fluoro-16β-methyl-17α-hydroxyprogesterone (the compound of Example 81B) is reacted with anhydrous hydrogen chloride in chloroform and the resultant product isolated and purified in the manner of Example 17A to give 6α-fluoro-16β-methyl-17α-hydroxyprogesterone.

B. 6α-FLUORO-16β-METHYL-17α-HYDROXYPROGESTERONE 17-ACETATE

The 17α-hydroxyprogesterone of Example 82A is reacted with acetic acid and trifluoroacetic anhydride and the resultant product isolated and purified in the manner of Example 2 to give 6α-fluoro-16β-methyl-17α-hydroxyprogesterone 17-acetate.

EXAMPLE 83

6β-fluoro-16β-methylprogesterone

A. 5α-HYDROXY-6β-FLUORO-16β-METHYLPREGNANE-3,20-DIONE

5α,6α-epoxy-16β-methylpregnane-3,20-dione 3,20-bis-ethylene ketal (the compound of Example 78B) is reacted with aqueous hydrofluoric acid and the resultant product which is isolated is reacted further with oxalic acid in methanol in the manner of Example 31A. The final product is isolated and purified in the described manner to give 5α-hydroxy-6β-fluoro-16β-methylpregnane-3,20-dione. This product is used without further purification in the following procedure.

B. 6β-FLUORO-16β-METHYLPROGESTERONE

The 5α-hydroxy-6β-fluoropregnane of Example 83A is reacted with aqueous acetic acid and the resultant product isolated and purified in the manner of Example 31B to give 6β-fluoro-16β-methylprogesterone.

EXAMPLE 84

6α-fluoro-16β-methylprogesterone

6β-fluoro-16β-methylprogesterone (the compound of Example 83) is reacted with anhydrous hydrogen chloride in chloroform in the manner of Example 17A and the resultant product isolated and purified to give 6α-fluoro-16β-methylprogesterone.

EXAMPLE 85

16β-methyl-4,9(11)-pregnadiene-3,20-dione

A. 11α-HYDROXY-16β-METHYLPROGESTERONE

16β-methylprogesterone is subjected to the action of a culture of Rhizopus nigricans and the resultant product isolated and purified in a manner similar to that described in Example 20A to give 11α-hydroxy-16β-methylprogesterone.

B. 11α-HYDROXY-16β-METHYLPROGESTERONE 11-p-TOLUENESULFONATE

The 11α-hydroxy-16β-methylprogesterone of Example 85A is reacted with p-toluenesulfonyl chloride in chloroform and pyridine and the resultant product isolated and purified in the manner of Example 20B to give 11α-hydroxy-16β-methylprogesterone 11-p-toluenesulfonate.

C. 16β-METHYL-4,9(11)-PREGNADIENE-3,20-DIONE

The 11α-p-toluenesulfonate of Example 85B is reacted with anhydrous sodium acetate in acetic acid and the resultant product isolated and purified in the manner described in Example 20C to give 16β-methyl-4,9(11)-pregnadiene-3,20-dione.

EXAMPLE 86

6β,16β-dimethyl-4,9(11)-pregnadiene-3,20-dione

A. 11α-HYDROXY-16β-METHYL-5-PREGNENE-3,20-DIONE 3,20-BISETHYLENE KETAL

In the manner described in Example 4A, 11α-hydroxy-16β-methylprogesterone (the compound of Example 85A) is reacted with ethylene glycol and p-toluenesulfonic acid and the resultant product isolated and purified to give 11α-hydroxy-16β-methyl-5-pregnene-3,20-dione 3,20-bisethylene ketal.

B. 5α,6α-EPOXY-11α-HYDROXY-16β-METHYLPREGNANE-3,20-DIONE 3,20-BISETHYLENE KETAL

In the manner described in Example 4B, the 3,20-bisethylene ketal of Example 86A is reacted with perphthalic acid and the resultant product isolated and purified to give 5α,6α-epoxy-11α-hydroxy-16β-methylpregnane-3,20-dione 3,20-bisethylene ketal.

C. 5α,11α-DIHYDROXY-6β,16β-DIMETHYLPREGNANE-3,20-DIONE

The 5α,6α-epoxypregnane of Example 86B is reacted with methyl magnesium iodide in ether and the resultant product isolated and reacted further with oxalic acid in methanol in the manner of Example 26C. The final product is then isolated and purified in the described manner to give 5α,11α-dihydroxy-6β,16β-dimethylpregnane-3,20-dione.

D. 6β,16β-DIMETHYL-11α-HYDROXYPROGESTERONE

The 5α-hydroxy-6β-methylpregnane of Example 86C is refluxed in aqueous acetic acid and the resultant product isolated and purified in the manner described in Example 26D to give 6β,16β-dimethyl-11α-hydroxyprogesterone.

E. 6β,16β-DIMETHYL-11α-HYDROXYPROGESTERONE 11-p-TOLUENESULFONATE

The 11α-hydroxyprogresterone of Example 86D is reacted with p-toluenesulfonyl chloride in chloroform and pyridine in the manner described in Example 20B. The resultant product is isolated and purified in the described manner to give 6β,16β-dimethyl-11α-hydroxyprogesterone 11-p-toluenesulfonate.

F. 6β,16β-DIMETHYL-4,9(11)-PREGNADIENE-3,20-DIONE

The 11α-p-toluenesulfonate of Example 86E is reacted with calcium carbonate in methanol and the resultant product isolated and purified in the manner described in Example 47B to give 6β,16β-dimethyl-4,9(11)-pregnadiene-3,20-dione.

EXAMPLE 87

6α,16β-dimethyl-4,9(11)-pregnadiene-3,20-dione

A. 6α,16β-DIMETHYL-11α-HYDROXYPROGESTERONE

6β,16β-dimethyl-11α-hydroxyprogesterone (the compound of Example 86D) is reacted with anhydrous hydrogen chloride in chloroform at −10° C. in the manner of Example 5. The resultant product is isolated and purified in the described manner to give 6α-16β-dimethyl-11α-hydroxyprogesterone.

B. 6α,16β-DIMETHYL-11α-HYDROXYPROGESTERONE 11-p-TOLUENESULFONATE

In the manner of Example 20B, the 11α-hydroxyprogesterone of Example 87A is reacted with p-toluenesulfonyl chloride and pyridine and the resultant product isolated and purified to give 6α,16β-dimethyl-11α-hydroxyprogesterone 11-p-toluenesulfonate.

C. 6α,16β-DIMETHYL-4,9(11)-PREGNADIENE-3,20-DIONE

In the manner of Example 20C, the 11α-p-toluenesulfonate of Example 87B is reacted with sodium acetate in acetic acid and the resultant product isolated and purified to give 6α-16β-dimethyl-4,9(11)-pregnadiene-3,20-dione.

EXAMPLE 88

6β-fluoro-16β-methyl-4,9(11)-pregnadiene-3,20-dione

A. 5α,11α-DIHYDROXY-6β-FLUORO-16β-METHYL-PREGNANE-3,20-DIONE

In the manner described in Example 31A, 5α,6α-epoxy-11α-hydroxy-16β-methylpregnane-3,20-dione 3,20-bisethylene ketal (the compound of Example 86B) is reacted with aqueous hydrofluoric acid. The resultant product is isolated and reacted further with oxalic acid in methanol. The final product is then isolated and purified in the described manner to give 5α,11α-dihydroxy-6β-fluoro-16β-methylpregnane-3,20-dione. This product is used without further purification in the following procedure.

B. 6β-FLUORO-11α-HYDROXY-16β-METHYL-PROGESTERONE

The 5α-hydroxy-6β-fluoropregnane of Example 88A is refluxed with aqueous acetic acid and the resultant product isolated and purified in the described manner of Example 31B to give 6β-fluoro-11α-hydroxy-16β-methylprogesterone.

C. 6β-FLUORO-11α-HYDROXY-16β-METHYLPROGESTERONE 11-p-TOLUENESULFONATE

The 11α-hydroxyprogesterone of Example 88B is reacted with p-toluenesulfonyl chloride in chloroform and pyridine and the resultant product isolated and purified in the manner of Example 20B to give 6β-fluoro-11α-hydroxy-16β-methylprogesterone 11-p-toluenesulfonate.

D. 6β-FLUORO-16β-METHYL-4,9(11)-PREGNADIENE-3,20-DIONE

In the manner described in Example 47B, the 11α-p-toluenesulfonate of Example 88C is reacted with anhydrous calcium carbonate in methanol and the resultant product isolated and purified to give 6β-fluoro-16β-methyl-4,9(11)-pregnadiene-3,20-dione.

EXAMPLE 89

6α-fluoro-16β-methyl-4,9(11)-pregnadiene-3,20-dione

A. 6α-FLUORO-11α-HYDROXY-16β-METHYL-PROGESTERONE

6β-fluoro-11α-hydroxy-16β-methylprogesterone (the compound of Example 88B) is reacted with anhydrous hydrogen chloride in chloroform at −20° C. and the resultant product isolated and purified in the manner described in Example 17A to give 6α-fluoro-11α-hydroxy-16β-methylprogesterone.

B. 6α-FLUORO-11αHYDROXY-16β-METHYLPROGESTERONE 11-p-TOLUENESULFONATE

In the manner of Example 20B, the 11α-hydroxyprogesterone of Example 89A is reacted with p-toluenesulfonyl chloride in chloroform and pyridine and the resultant product is isolated and purified to give 6α-fluoro-11α-hydroxy-16β-methylprogesterone 11-p-toluenesulfonate.

C. 6α-FLUORO-16β-METHYL-4,9(11)-PREGNADIENE-3,20-DIONE

In the manner of Example 20C, the 11α-p-toluenesulfonate of Example 89B is reacted with sodium acetate in acetic acid and the resultant product isolated and purified to give 6α-fluoro-16β-methyl-4,9(11)-pregnadiene-3,20-dione.

EXAMPLE 90

16β-methyl-21-fluoro-4,9(11)-pregnadiene-3,20-dione

A. 16β-METHYL-21-IODO-4,9(11)-PREGNADIENE-3,20-DIONE

In the manner described in Example 8, 16β-methyl-4,9(11)-pregnadiene-3,20-dione (the compound of Example 85) is reacted with iodine and finely powdered calcium oxide in tetrahydrofuran and methanol and the resultant product isolated and purified to give 16β-methyl-21-iodo-4,9(11)-pregnadiene-3,20-dione.

B. 16β-METHYU-21-FLUORO-4,9(11)-PREGNADIENE-3,20-DIONE

In the manner described in Example 10, the 21-iodopregnadiene of Example 90A in moist acetonitrile is reacted with silver fluoride and the resultant product isolated and purified to give 16β-methyl-21-fluoro-4,9(11)-pregnadiene-3,20-dione.

EXAMPLE 91

*6α,16β-dimethyl-17α-hydroxy-4,9(11)-pregnadiene-3,20-dione 17-acetate*

A. 11α,17α-DIHYDROXY-16β-METHYLPROGESTERONE

In the manner of Example 20A, 16β-methyl-17α-hydroxyprogesterone (the compound of Example 72) is subjected to the action of a culture of *Rhizopus nigricans* and the resultant product isolated and purified to give 11α,17α-dihydroxy-16β-methylprogesterone.

B. 11α,17α-DIHYDROXY-16β-METHYL-5-PREGNENE-3,20-DIONE 3,20-BISETHYLENE KETAL

In the manner of Example 4A, 11α,17α-dihydroxy-16β-methylprogesterone (the compound of Example 91A) is reacted with ethylene glycol and p-toluenesulfonic acid and the resultant product isolated and purified to give 11α,17α-dihydroxy - 16β - methyl - 5-pregnene-3,20-dione 3,20-bisethylene ketal.

C. 5α,6α-EPOXY-11α,17α-DIHYLROXY-16β-METHYLPREGNANE-3,20-DIONE 3,20-BISETHYLENE KETAL

The 5-pregnene of Example 91B is reacted with perphthalic acid and the resultant product is isolated and purified in the manner of Example 4B to give 5α,6α-epoxy-11α,17α-dihydroxy-16β-methylpregnane - 3,20-dione 3,20-bisethylene ketal.

D. 5α,11α,17α-TRIHYDROXY-6β,16β-DIMETHYL-PREGNANE-3,20-DIONE

In the manner described in Example 26C, the 5α,6α-epoxypregnane of Example 91C is reacted with methyl magnesium iodide in ether. The resultant product is further reacted with oxalic acid in methanol to yield a final product which is isolated and purified in the described manner to give 5α,11α,17α-trihydroxy-6β,16β-dimethylpregnane-3,20-dione.

E. 6β,16β-DIMETHYL-11α,17α-DIHYDROXY-PROGESTERONE

The 5α-hydroxy-6β-methylpregnane of Example 91D is reacted with aqueous acetic acid and the resultant product isolated and purified in the manner of Example 26D to give 6β,16β-dimethyl-11α,17α-dihydroxyprogesterone.

F. 6α,16β-DIMETHYL-11α,17α-DIHYDROXY-PROGESTERONE

The 16β-methylprogesterone of Example 91E is reacted with anhydrous hydrogen chloride in chloroform at −10° C. and the resultant product is isolated and purified in the manner described in Example 5 to give 6α,16β-dimethyl-11α,17α-dihydroxyprogesterone.

G. 6α,16β-DIMETHYL-11α,17α-DIHYDROXYPROGESTERONE 11-p-TOLUENESULFONATE

The 11α-hydroxyprogesterone of Example 91F is reacted with p-toluenesulfonyl chloride in chloroform and pyridine and the resultant product isolated and purified in the manner of Example 20B to give 6α,16β-dimethyl-11α,17α-dihydroxyprogesterone 11-p-toluenesulfonate.

H. 6α,16β-DIMETHYL-17α-HYDROXY-4,9(11)-PREG-NADIENE13,20-DIONE

In the manner of Example 20C, the 11-p-toluenesulfonate of Example 91G is reacted with anhydrous sodium acetate in acetic acid and the resultant product isolated and purified to give 6α,16β-dimethyl-17α-hydroxy-4,9(11)-pregnadiene-3,20-dione.

I. 6α,16β-DIMETHYL-17α-HYDROXY-4,9(11)-PREG-NADIENE-3,20-DIONE 17-ACETATE

The 17α-hydroxypregnadiene of Example 91H is reacted with acetic acid and trifluoro acetic anhydride in the manner of Example 2 to give 6α,16β-dimethyl-17α-hydroxy-4,9(11)-pregnadiene-3,20-dione 17-acetate.

EXAMPLE 92

*6β-fluoro-16β-methyl-17α-hydroxy-4,9(11)-pregnadiene-3,20-dione 17-acetate*

A. 5α,11α,17α-TRIHYDROXY-6β-FLUORO-16β-METHYL-PREGNANE-3,20-DIONE

In the manner of Example 31A, 5α,6α-epoxy-11α,17α-dihydroxy-16β-methylpregnane-3,20-dione 3,20 - bisethylene ketal (the compound of Example 91C) is reacted with aqueous hydrofluoric acid and the resultant product isolated and reacted further with oxalic acid in methanol. The final product is isolated and purified in the described manner to give 5α,11α,17α-trihydroxy-6β-fluoro-16β-methylpregane-3,20-dione. This product is used without further purification in the following procedure.

B. 6β-FLUORO-11α,17α-DIHYDROXY-16β-METHYL-PROGESTERONE

In the manner of Example 31B, the 5α-hydroxy-6β-fluoropregnane of Example 92A is refluxed in aqueous acetic acid and the resultant product isolated and purified to give 6β-fluoro-11α,17α-dihydroxy - 16β - methylprogesterone.

C. 6β-FLUORO-11α,17α-DIHYDROXY-16β-METHYLPRO-GESTERONE 11-p-TOLUENESULFONATE

The 11α-hydroxyprogesterone of Example 92B is reacted with p-toluenesulfonyl chloride in chloroform and pyridine and the resultant product isolated and purified in the manner of Example 20B to give 6β-fluoro-11α,17α-dihydroxy-16β-methylprogesterone 11-p-toluenesulfonate.

D. 6β-FLUORO-16β-METHYL-17α-HYDROXY-4,9(11)-PREGNADIENE-3,20-DIONE

In the manner of Example 47B, the 11α-p-toluenesulfonate of Example 92C is reacted with anhydrous calcium carbonate in methanol and the resultant product isolated and purified to give 6β-fluoro-16β-methyl-17α-hydroxy-4,9(10)-pregnadiene-3,20-dione.

E. 6β-FLUORO-16β-METHYL-17α-HYDROXY-4,9(11)-PREG-NADIENE-3,20-DIONE 17-ACETATE

The 17α-hydroxypregnadiene of Example 92D is reacted with acetic acid and trifluoroacetic anhydride in the manner of Example 2 to give 6β-fluoro-16β-methyl-17α-hydroxy-4,9(11)-pregnadiene-3,20-dione 17-acetate.

EXAMPLE 93

*6α-fluoro-16β-methyl-17α-hydroxy-4,9(11)-pregnadiene-3,20-dione 17-acetate*

A. 6α-FLUORO-11α,17α-DIHYDROXY-16β-METHYL-PROGESTERONE

In the manner of Example 31C, 6β-fluoro-11α,17α-dihydroxy-16β-methylprogesterone (the compound of Example 92B) is reacted with anhydrous hydrogen chloride in chloroform and the resultant product isolated and purified to give 6α-fluoro-11α,17α-dihydroxy-16β-methylprogesterone.

B. 6α-FLUORO-11α,17α-DIHYDROXY-16β-METHYLPRO-GESTERONE 11-p-TOLUENESULFONATE

The 11α-hydroxyprogesterone of Example 93A is reacted with p-toluenesulfonyl chloride in chloroform and pyridine and the resultant product isolated and purified in the manner described in Example 20B to give 6α-fluoro-11α,17α-dihydroxy-16β-methylprogesterone 11-p-toluenesulfonate.

C. 6α-FLUORO-16β-METHYL-17α-HYDROXY-4,9(11)-PREGNADIENE-3,20-DIONE

In the manner of Example 20C, the 11α-p-toluenesulfonate progesterone of Example 93B is reacted with anhydrous sodium acetate in acetic acid and the resultant product isolated and purified to give 6α-fluoro-16β-methyl-17α-hydroxy-4,9(11)-pregnadiene-3,20-dione.

D. 6α-FLUORO-16β-METHYL-17α-HYDROXY-4,9(11)-PREGNADIENE-3,20-DIONE 17-ACETATE

The 17α-hydroxypregnadiene of Example 93C is reacted with acetic acid and trifluoroacetic anhydride in the manner of Example 2 to give 6α-fluoro-16β-methyl-17α-hydroxy-4,9(11)-pregnadiene-3,20-dione 17-acetate.

EXAMPLE 94

*6α,21-difluoro-16β-methyl-17α-hydroxy-4,9(11)-pregnadiene-3,20-dione 17-acetate*

A. 6α-FLUORO-21-IODO-16β-METHYL-17α-HYDROXY-4,9(11)-PREGNADIENE-3,20-DIONE

6α - fluoro - 16β - methyl - 17α - hydroxy - 4,9(11)-pregnadiene-3,20-dione (the compound of Example 93C) is reacted with iodine and calcium oxide in tetrahydrofuran and methanol and the resultant product isolated and purified in the manner of Example 8 to give 6α-fluoro - 21 - iodo - 16β - methyl - 17α - hydroxy - 4,9(11)-pregnadiene-3,20-dione.

B. 6α,21-DIFLUORO-16β-METHYL-17α-HYRDOXY-4,9(11)-PREGNADIENE-3,20-DIONE

In the manner of Example 10, the 21-iodopregnadiene of Example 94A in moist acetonitrile is reacted with silver fluoride and the resultant product isolated and purified to give 6α,21-difluoro-16β-methyl-17α-hydroxy-4,9(11)-pregnadiene-3,20-dione.

C. 6α,21-DIFLUORO-16β-METHYL-17α-HYDROXY-4,9(11)-PREGNADIENE-3,20-DIONE 17-ACETATE

In the manner of Example 2, the 17α-hydroxypregnadiene of Example 94B is reacted with acetic acid and trifluoroacetic anhydride to give 6α-21-difluoro-16β-methyl-17α-hydroxy-4,9(11)-pregnadiene-3,20-dione 17-acetate.

EXAMPLE 95

*16β-methyl-17α-hydroxy-4,9(11)-pregnadiene-3,20-dione 17-acetate*

A. 11α,17α-DIHYDROXY-16β-METHYLPROGESTERONE 11-p-TOLUENESULFONATE

In the manner described in Example 20B, 11α,17α-dihydroxy-16β-methylprogesterone (the compound of Example 91A) is reacted with p-toluenesulfonyl chloride in carbon tetrachloride and pyridine and the resultant product isolated and purified to give 11α,17α-dihydroxy-16β-methylprogesterone 11-p-toluenesulfonate.

B. 16β-METHYL-17α-HYDROXY-4,9(11)-PREGNADIENE-3,20-DIONE

In the manner described in Example 20C, the 11α-p-toluenesulfonate ester of the progesterone of Example 95A is reacted with anhydrous sodium acetate in acetic acid and the resultant product isolated and purified to give 16β-methyl-17α-hydroxy-4,9(11)-pregnadiene-3,20-dione.

C. 16β-METHYL-17α-HYDROXY-4,9(11)-PREGNADIENE-3,20-DIONE 17-ACETATE

The 17α-hydroxypregnadiene of Example 95B is reacted with acetic acid and trifluoroacetic anhydride in the manner of Example 2 to give 16β-methyl-17α-hydroxy-4,9(11)-pregnadiene-3,20-dione 17-acetate.

Similarly, by substituting other 17-lower alkanoic acids such as valeric and propionic for acetic acid in the above procedure, the corresponding 17-lower alkanoates are obtained, i.e., the 17-valerate and 17-propionate of 16β-methyl-17α-hydroxy-4,9(11)-pregnadiene-3,20-dione.

EXAMPLE 96

*9α,11β-dichloro-16β-methylprogesterone*

16β-methyl-4,9(11)-pregnadiene-3,20-dione (the compound of Example 85) is chlorinated with chlorine in carbon tetrachloride in the presence of pyridine and the resultant product isolated and purified to give 9α,11β-dichloro-16β-methylprogesterone.

Similarly, the 4,9(11)-pregnadienes prepared in Examples 85 through 95 are chlorinated by the above procedure and the resultant products isolated and purified to give, respectively, 6β,16β-dimethyl-9α,11β-dichloroprogesterone,
6α,16β-dimethyl-9α,11β-dichloroprogesterone,
6β-fluoro-9α,11β-dichloro-16β-methylprogesterone,
6α-fluoro-9α,11β-dichloro-16β-methylprogesterone,
9α,11β-dichloro-21-fluoro-16β-methylprogesterone,
6α,16β-dimethyl-9α-11β-dichloro-17α-hydroxyprogesterone,
6α,16β-dimethyl-9α,11β-dichloro-17α-hydroxyprogesterone 17-acetate,
6β-fluoro-9α,11β-dichloro-16β-methyl-17α-hydroxyprogesterone,
6β-fluoro-9α,11β-dichloro-16β-methyl-17α-hydroxyprogesterone 17-acetate,
6α-fluoro-9α,11β-dichloro-16β-methyl-17α-hydroxyprogesterone,
6α-fluoro-9α,11β-dichloro-16β-methyl-17α-hydroxyprogesterone 17-acetate,
6α,21-difluoro-9α,11β-dichloro-16β-methyl-17α-hydroxyprogesterone,
6α,21-difluoro-9α,11β-dichloro-16β-methyl-17α-hydroxyprogesterone 17-acetate,
9α,11β-dichloro-16β-methyl-17α-hydroxyprogesterone,
and 9α,11β-dichloro-16β-methyl-17α-hydroxyprogesterone 17-acetate.

EXAMPLE 97

*9α-chloro-11β-fluoro-16β-methylprogesterone*

16β-methyl-4,9(11)-pregnadiene-3,20-dione (the compound of Example 85) is reacted with N-chlorosuccinimide and hydrogen fluoride in diethylacetic acid and the resultant product isolated and purified in the manner described in Example 24 to give 9α-chloro-11β-fluoro-16β-methylprogesterone.

In like manner, the 9α-chloro-11β-fluoro derivatives of the 4,9(11)-pregnadienes prepared in Examples 85 through 95 are obtained to give, respectively, 6β,16β-dimethyl-9α-chloro-11β-fluoroprogesterone,
6α,16β-dimethyl-9α-chloro-11β-fluoroprogesterone,
6β,11β-difluoro-9α-chloro-16β-methylprogesterone
6α,11β-difluoro-9α-chloro-16β-methylprogesterone
9α-chloro-11β,21-difluoro-16β-methylprogesterone,
6α,16β-dimethyl-9α-chloro-11β-fluoro-17α-hydroxyprogesterone,
6β,16β-dimethyl-9α-chloro-11β-fluoro-17α-hydroxyprogesterone 17-acetate,
6β,11β-difluoro-9α-chloro-16β-methyl-17α-hydroxyprogesterone,
6β,11β-difluoro-9α-chloro-16β-methyl-17α-hydroxyprogesterone 17-acetate,
6α,11β-difluoro-9α-chloro-16β-methyl-17α-hydroxyprogesterone,
6α,11β-difluoro-9α-chloro-16β-methyl-17α-hydroxyprogesterone 17-acetate,
6α,11β,21-trifluoro-9α-chloro-16β-methyl-17α-hydroxyprogesterone,
6α,11β,21-trifluoro-9α-chloro-16β-methyl-17α-hydroxyprogesterone 17-acetate,
9α-chloro-11β-fluoro-16β-methyl-17α-hydroxyprogesterone and
9α-chloro-11β-fluoro-16β-methyl-17α-hydroxyprogesterone 17-acetate.

The 16α-ethylpregnane derivatives of Examples 56, 58, 62 and 64 and the 16α-n-butylpregnane derivatives prepared in Examples 57, 59, 60 and 66 may be subjected to the procedures outlined in Examples 1 through 55 yielding the corresponding 16α-ethyl and 16α-n-butyl derivatives thereof. In similar manner, the 16β-ethylpregnane derivatives prepared in Examples 62, 63 and 65 and the 16β-n-butylpregnane derivatives prepared in Examples 60, 61 and 67 may be reacted in a manner similar to that described in Examples 68 through 97 to yield the 16β-ethyl and 16β-n-butyl derivatives thereof.

We claim:
1. 6-W-9α-X-11β-Y-16-lower alkyl-17α-R-progesterone wherein W is a member of the group consisting of hydrogen and methyl; X is a halogen having an atomic weight greater than 19; Y is a halogen having an atomic weight less than 126 and being at least as electronegative as X; and R is an acyloxy radical of a hydrocarbon carboxylic acid having up to 12 carbon atoms.
2. A compound of claim 1 wherein W is hydrogen.
3. A compound of claim 1 wherein W is methyl.
4. A compound of claim 1 wherein X and Y are chloro, W is α-methyl, lower alkyl is methyl, R is acetoxy, said compound being 6α,16-dimethyl-9α,11β-dichloro-17α-hydroxyprogesterone 17-acetate.
5. A compound of claim 1 wherein X and Y are chloro, W is α-methyl, lower alkyl is α-methyl, R is caprooxy, said compound being 6α,16-dimethyl-9α,11β-dichloro-17α-hydroxyprogesterone 17-caproate.
6. A compound of claim 1 wherein X and Y are chloro, W is hydrogen, lower alkyl is methyl and R is acetoxy, said compound being 9α,11β-dichloro-16-methyl-17α-hydroxyprogesterone 17-acetate.
7. A compound of claim 1 wherein X is chloro, Y is fluoro, W is hydrogen, lower alkyl is methyl, and R is acetoxy, said compound being 9α-chloro-11β-fluoro-16α-methyl-17α-hydroxyprogesterone 17-acetate.
8. 6-W-16-lower alkyl-17α-R-21-Z progesterone wherein W is a member of the group consisting of hydrogen, methyl and fluorine; R is an acyloxy radical of a hydrocarbon carboxylic acid having up to 12 carbon atoms and Z is halogen.
9. A compound of claim 8 wherein W is hydrogen.
10. A compound of claim 8 wherein W is methyl.
11. A compound of claim 8 wherein W is fluorine.
12. A compound of claim 8 wherein W is α-methyl, lower alkyl is methyl, R is acetoxy and Z is fluorine, said compound being 6α,16-dimethyl-17α-hydroxy-21-fluoroprogesterone 17-acetate.
13. A compound of claim 8 wherein W is α-fluoro, lower alkyl is α-methyl, R is acetoxy, and Z is fluorine, said compound being 6α,21-difluoro-16α-methyl-17α-acetoxyprogesterone.
14. 16-lower alkyl-17α-R-progresterone wherein R is an acyloxy radical of a hydrocarbon carboxylic acid having up to 12 carbon atoms.
15. A compound of claim 14 wherein the lower alkyl is α-methyl and R is acetoxy, said compound being 16α-methyl-17α-hydroxyprogesterone 17-acetate.
16. A compound of claim 14 wherein lower alkyl is α-methyl and R is caprooxy, said compound being 16α-methyl-17α-hydroxyprogesterone 17-caproate.
17. A compound of claim 14, wherein lower alkyl is β-methyl and R is acetoxy, said compound being 16β-methyl-17α-acetoxyprogesterone.
18. Compounds having the following formula:

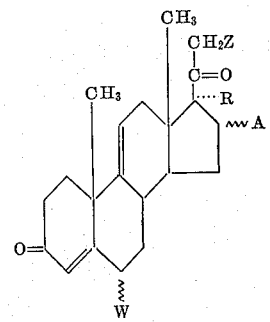

wherein A is lower alkyl; R is a member of the group consisting of hydrogen, hydroxy and an acyloxy radical of a hydrocarbon carboxylic acid containing up to 12 carbon atoms; W is a member of the group consisting of fluorine and methyl; and Z is a member of the group consisting of hydrogen and halogen.

References Cited by the Examiner

UNITED STATES PATENTS

| | | | |
|---|---|---|---|
| 2,838,495 | 6/1958 | Campbell et al. | 260—397.45 |
| 2,838,496 | 6/1958 | Babcock et al. | 260—397.45 |
| 2,838,535 | 6/1958 | Magerlein et al. | 260—397.45 |
| 2,867,631 | 1/1959 | Lincoln et al. | 260—397.45 |
| 2,878,247 | 3/1959 | Miramontes et al. | 260—397.45 |
| 2,880,213 | 3/1959 | Loken et al. | 260—397.45 |
| 3,009,929 | 11/1961 | Reimann et al. | 260—397.3 |
| 3,009,932 | 11/1961 | Reimann et al. | 260—397.3 |
| 3,131,200 | 4/1964 | Reimann et al. | 260—397.3 |
| 3,158,629 | 11/1964 | Djerassi et al. | 260—397.4 |
| 3,160,642 | 12/1964 | Djerassi | 260—397.4 |
| 3,168,536 | 2/1965 | Kirk et al. | 260—397.3 |

OTHER REFERENCES

Ringold et al., J. Org. Chem., vol. 22 (1957), pages 99–100.

Turner: J. Am. Chem. Soc., vol 75 (1953), pages 3489–92.

LEWIS GOTTS, *Primary Examiner.*

L. H. GASTON, M. LIEBMAN, *Examiners.*

M. L. WILLIAMS, M. A. GANNON, G. E. LANDE,
  *Assistant Examiners.*